(12) United States Patent
Naito et al.

(10) Patent No.: US 12,337,514 B2
(45) Date of Patent: Jun. 24, 2025

(54) HYBRID CORE DRIVING DEVICE AND MOLDING MACHINE

(71) Applicant: SHIBAURA MACHINE CO., LTD., Tokyo (JP)

(72) Inventors: Mitsutoshi Naito, Ebina (JP); Makoto Tsuji, Yamato (JP); Saburo Noda, Atsugi (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 519 days.

(21) Appl. No.: 17/805,398

(22) Filed: Jun. 3, 2022

(65) Prior Publication Data

US 2022/0347904 A1 Nov. 3, 2022

Related U.S. Application Data

(63) Continuation of application No. PCT/JP2020/044579, filed on Dec. 1, 2020.

(30) Foreign Application Priority Data

Dec. 4, 2019 (JP) .................. 2019-219814

(51) Int. Cl.
- *B22D 17/24* (2006.01)
- *B29C 45/36* (2006.01)
- *B29C 45/68* (2006.01)

(52) U.S. Cl.
CPC ............. *B29C 45/36* (2013.01); *B29C 45/68* (2013.01); *B29C 2045/363* (2013.01); *B29C 2045/686* (2013.01)

(58) Field of Classification Search
CPC .... B22D 17/00; B22D 17/2236; B22D 17/24; B22D 17/26; B22C 9/10; B22C 9/108;
(Continued)

(56) References Cited

U.S. PATENT DOCUMENTS

| 6,257,117 | B1 | 7/2001 | Yagishita |
| 2014/0131391 | A1 | 5/2014 | Yamaguchi |
| 2016/0001357 | A1 | 1/2016 | Abe et al. |

FOREIGN PATENT DOCUMENTS

| CN | 1861380 | 11/2006 |
| CN | 104722739 | 6/2015 |

(Continued)

OTHER PUBLICATIONS

International Search Report issued in PCT/JP2020/044579 mailed Feb. 9, 2021.

(Continued)

*Primary Examiner* — Kevin P Kerns
*Assistant Examiner* — Steven S Ha
(74) *Attorney, Agent, or Firm* — DLA Piper LLP (US)

(57) ABSTRACT

A hybrid core driving device of an embodiment includes: a cylinder tube; a first cover member at one end of the cylinder tube; a second cover member at the other end thereof; a rod in the cylinder tube, having a connecting portion at one end to be connectable to a core and an annular flange on the side of the second cover member, and penetrating the first cover member; a nut fixed to the rod; a screw shaft penetrating the second cover member and the nut and provided to be insertable into the rod; a motor rotating the screw shaft; a piston in the cylinder tube, allowing the rod to penetrate therethrough, and slidable with respect to the cylinder tube and the rod; and a connection portion connectable to a pipe supplying a hydraulic liquid to a region surrounded by the cylinder tube, the first cover member, and the piston.

10 Claims, 27 Drawing Sheets

(58) Field of Classification Search
CPC ... B29C 45/36; B29C 45/68; B29C 2045/363; B29C 2045/686
See application file for complete search history.

(56) References Cited

FOREIGN PATENT DOCUMENTS

| | | |
|---|---|---|
| DE | 102007053044 B3 | 6/2009 |
| FR | 2805190 | 8/2001 |
| JP | H10-128756 | 5/1998 |
| JP | 2000-274403 | 10/2000 |
| JP | 2001-246658 | 9/2001 |
| JP | 2011-115811 | 6/2011 |
| JP | 2012-232331 | 11/2012 |
| JP | 2016-007625 | 1/2016 |
| JP | 2016-013565 | 1/2016 |

OTHER PUBLICATIONS

Written Opinion issued in PCT/JP2020/044579 mailed Feb. 9, 2021.
English language abstract of JP 302251 issued Mar. 21, 2000.
Indian Office Action in Application No. 202217037401, dated Nov. 18, 2022.
Chinese Office Action in Application No. 202080073447.5, dated Feb. 22, 2023.
International Preliminary Report on Patentability in PCT/JP2020/044579 mailed Jun. 16, 2022.

MOLD OPENING DIRECTION ← → MOLD CLOSING DIRECTION

MOLD OPENING DIRECTION
MOLD CLOSING DIRECTION

MOLD OPENING DIRECTION ← → MOLD CLOSING DIRECTION

MOLD OPENING DIRECTION ← → MOLD CLOSING DIRECTION

MOLD OPENING DIRECTION ←→ MOLD CLOSING DIRECTION

HYBRID CORE DRIVING DEVICE AND MOLDING MACHINE

CROSS-REFERENCE TO RELATED APPLICATION

This application is continuation application of, and claims the benefit of priority from the International Application PCT/JP2020/44579, filed on Dec. 1, 2020, which claims the benefit of priority from Japanese Patent Application No. 2019-219814, filed on Dec. 4, 2019, the entire contents of all of which are incorporated herein by reference.

FIELD OF THE INVENTION

The present invention relates to a core driving device and a molding machine used when manufacturing a product using a mold having a core.

BACKGROUND OF THE INVENTION

A die casting machine which is an example of a molding machine manufactures a product (die-cast product) by filling a molten metal into a cavity in a mold, clamped by a mold clamping device, using an injection device. When the product has an undercut in a mold opening and closing direction, a mold having a core is used in addition to a fixed die and a movable die.

When using the mold having the core, a core driving device inserting the core into the fixed die or the movable die and pulling out the core from the fixed die or the movable die is provided. When pulling out the core from the fixed die or the movable die, the core driving device requires a large driving force in order to pull the core away from the product. Then, it is preferable to rapidly retract the core in order to shorten the cycle time of the die casting machine after the core is pulled away from the product.

JP 3022551 B1 describes a cylinder device which uses a hydraulic circuit to generate a large driving force at a low speed at an initial stage of operation and then is operated at a high speed. The cylinder device of Patent Document 1 has problems that a large amount of hydraulic oil is required, a structure is complicated, energy saving is difficult, and a working environment deteriorates due to oil stains. Further, when the cylinder device of Patent Document 1 is used as the core driving device, it is assumed that the mold clamping device of the die casting machine and the hydraulic circuit of the core driving device are shared. When the hydraulic circuit is shared, it is not possible to perform the opening and closing operation of the fixed die and the movable die and the operation of the core at the same time and it is difficult to shorten the cycle time of the die casting machine.

SUMMARY OF THE INVENTION

A hybrid core driving device according to an aspect of the invention includes: a cylinder tube; a first cover member fixed to one end of the cylinder tube; a second cover member fixed to the other end of the cylinder tube; a rod provided in the cylinder tube, at least a part of the rod provided in the cylinder tube, the rod having a connecting portion provided at one end to be connectable to a core, the rod having an annular flange provided on the side of the second cover member in relation to the connecting portion, the rod penetrating the first cover member, and the rod configured to move straight with respect to the cylinder tube; a nut fixed to the rod; a screw shaft penetrating the second cover member and the nut, the screw shaft provided to be insertable into the rod and to be rotatable; a motor rotating the screw shaft; an annular piston provided in the cylinder tube, the rod penetrating through the annular piston, and the annular piston being slidable with respect to the cylinder tube and the rod; and a connection portion provided at the cylinder tube, the connection portion being connectable to a pipe supplying a hydraulic liquid operating the piston, the pipe configured to supply the hydraulic liquid to a region surrounded by the cylinder tube, the first cover member, and the piston.

In the core driving device of the above-described aspect, the cylinder tube may include a first region on the side of the first cover member and a second region on the side of the second cover member, a first inner diameter of the first region may be larger than a second inner diameter of the second region, and the piston may be provided inside the first region and an outer diameter of the piston may be larger than the second inner diameter.

In the hybrid core driving device of the above-described aspect, a movable distance of the piston may be 10 mm or less.

The hybrid core driving device of the above-described aspect may further include: the pipe; and a first liquid pressure circuit connected to the pipe and including an accumulator and a switching valve.

In the hybrid core driving device of the above-described aspect, the first liquid pressure circuit may be configured to fill the hydraulic liquid into the accumulator when the piston moves toward the first cover member.

A molding machine according to an aspect of the invention includes: a base; a fixed die plate fixed onto the base and holding a fixed die; a movable die plate provided on the base to be movable in a mold opening and closing direction and holding a movable die to face the fixed die; a hybrid core driving device driving a core to be combined with the fixed die and the movable die; a mold clamping device clamping the fixed die and the movable die; an injection device filling a molten material into a cavity formed by the fixed die, the movable die, and the core; and a control circuit controlling an operation of the hybrid core driving device, wherein the hybrid core driving device includes: a cylinder tube, a first cover member fixed to one end of the cylinder tube, a second cover member fixed to the other end of the cylinder tube, a rod provided in the cylinder tube, at least a part of the rod provided in the cylinder tube, the rod having a connecting portion provided at one end to be connectable to the core, the rod having an annular flange provided on the side of the second cover member in relation to the connecting portion, the rod penetrating the first cover member, and the rod configured to move straight with respect to the cylinder tube, a nut fixed to the rod, a screw shaft penetrating the second cover member and the nut, the screw shaft provided to be insertable into the rod and to be rotatable, a motor rotating the screw shaft, an annular piston provided in the cylinder tube, the rod penetrating through the annular piston, and the annular piston slidable with respect to the cylinder tube and the rod, and a connection portion provided at the cylinder tube, the connection portion being connectable to a pipe supplying a hydraulic liquid operating the piston, the pipe configured to supply the hydraulic liquid to a region surrounded by the cylinder tube, the first cover member, and the piston.

The molding machine of the above-described aspect may further include: the pipe; and a first liquid pressure circuit connected to the pipe and including an accumulator and a switching valve.

In the molding machine of the above-described aspect, the control circuit may control the hybrid core driving device so that the supply of the hydraulic liquid to the region and the rotation of the screw shaft by the motor are performed at the same time when pulling out the core from the fixed die or the movable die.

The molding machine of the above-described aspect may further include: a second liquid pressure circuit driving the mold clamping device or the injection device and the amount of the hydraulic liquid used in the second liquid pressure circuit may be larger than the amount of the hydraulic liquid used in the first liquid pressure circuit.

In the molding machine of the above-described aspect, the control circuit may control the mold clamping device, and the control circuit may control the mold clamping device and the hybrid core driving device so that the movable die and the core are operated at the same time.

DETAILED DESCRIPTION OF THE EMBODIMENTS

Hereinafter, embodiments of the invention will be described with reference to the drawings.

Additionally, in the present specification, a description will be made such that a hydraulic pressure is used as an example of a liquid pressure. For example, a description will be made such that a hydraulic circuit is used as an example of a liquid pressure circuit. Instead of the hydraulic pressure, for example, water pressure can be used. Further, in the present specification, a description will be made such that a hydraulic oil is used as an example of a hydraulic liquid.

First Embodiment

A hybrid core driving device of a first embodiment includes: a cylinder tube; a first cover member fixed to one end of the cylinder tube; a second cover member fixed to the other end of the cylinder tube; a rod provided in the cylinder tube so that at least a part is provided in the cylinder tube, having a connecting portion provided at one end to be connectable to a core and an annular flange provided on the side of the second cover member in relation to the connecting portion, penetrating the first cover member, and movable straight with respect to the cylinder tube; a nut fixed to the rod; a screw shaft penetrating the second cover member and the nut and provided to be insertable into the rod and to be rotatable; a motor rotating the screw shaft; an annular piston provided in the cylinder tube, allowing the rod to penetrate therethrough, and slidable with respect to the cylinder tube and the rod; and a connection portion provided in the cylinder tube and connectable to a pipe supplying a hydraulic liquid operating the piston to a region surrounded by the cylinder tube, the first cover member, and the piston.

Figure 1:
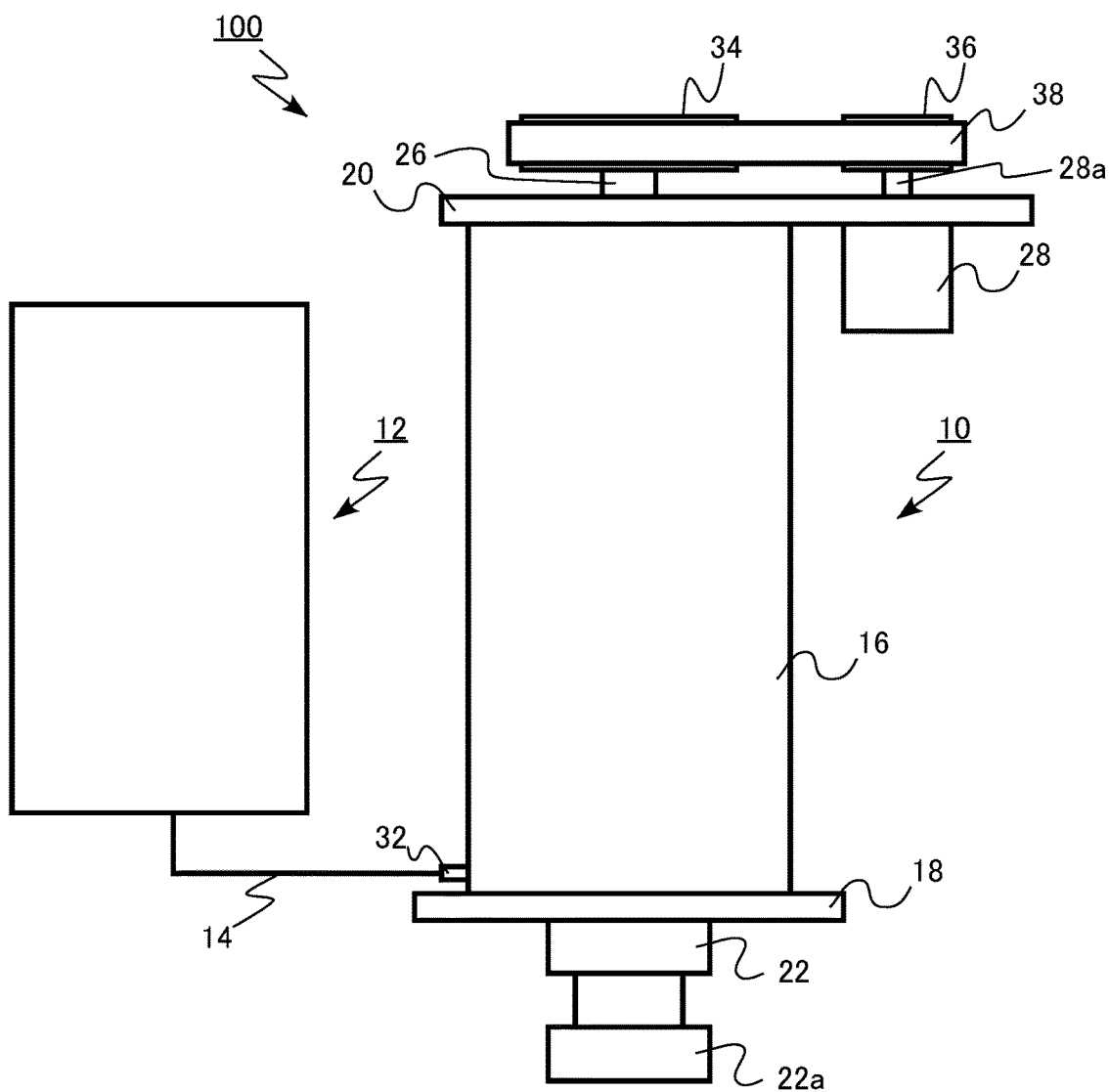
FIG. 1 is a schematic view of a hybrid core driving device of a first embodiment.
Figure 2A:
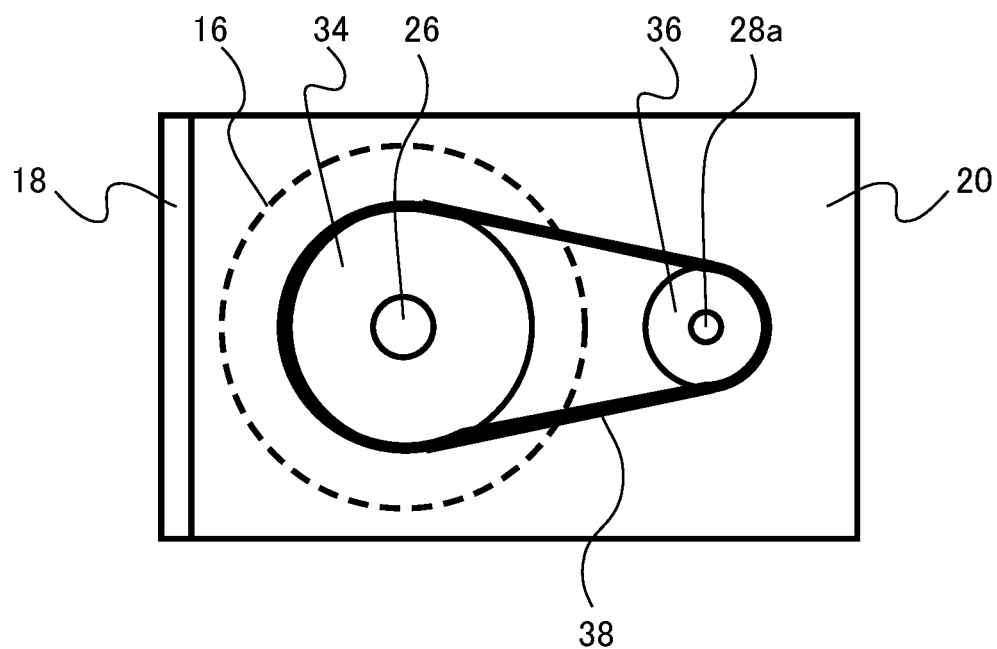
FIGS. 2A and 2B are schematic views of the hybrid core driving device of the first embodiment.
Figure 2B:
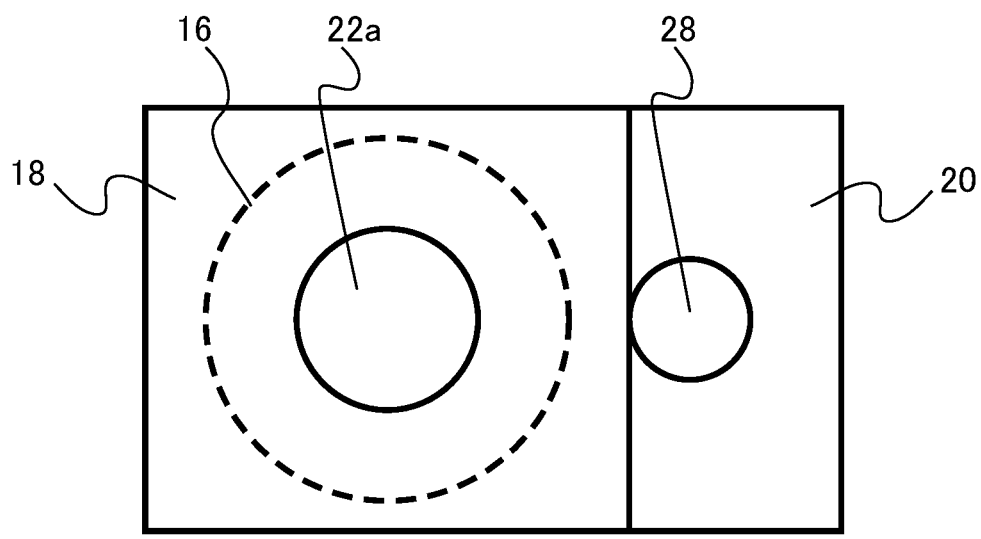

FIG. 1 is a schematic view of the hybrid core driving device of the first embodiment. FIG. 1 is a side view of the hybrid core driving device. FIGS. 2A and 2B are schematic views of the hybrid core driving device of the first embodiment. FIG. 2A is a plan view and FIG. 2B is a bottom view.

For example, a hybrid core driving device 100 of the first embodiment inserts a core into a fixed die or a movable die of a die casting machine and pulls out the core from the fixed die or the movable die. The hybrid core driving device 100 of the first embodiment is a core driving device that performs both a hydraulic drive and an electric power drive. In the present specification, a type in which a hydraulic drive and an electric power drive are performed together is referred to as a hybrid type.

The hybrid core driving device 100 includes a cylinder unit 10 and a first hydraulic circuit 12 (a first liquid pressure circuit). A pipe 14 through which hydraulic oil flows is connected between the cylinder unit 10 and the first hydraulic circuit 12.

Figure 3:
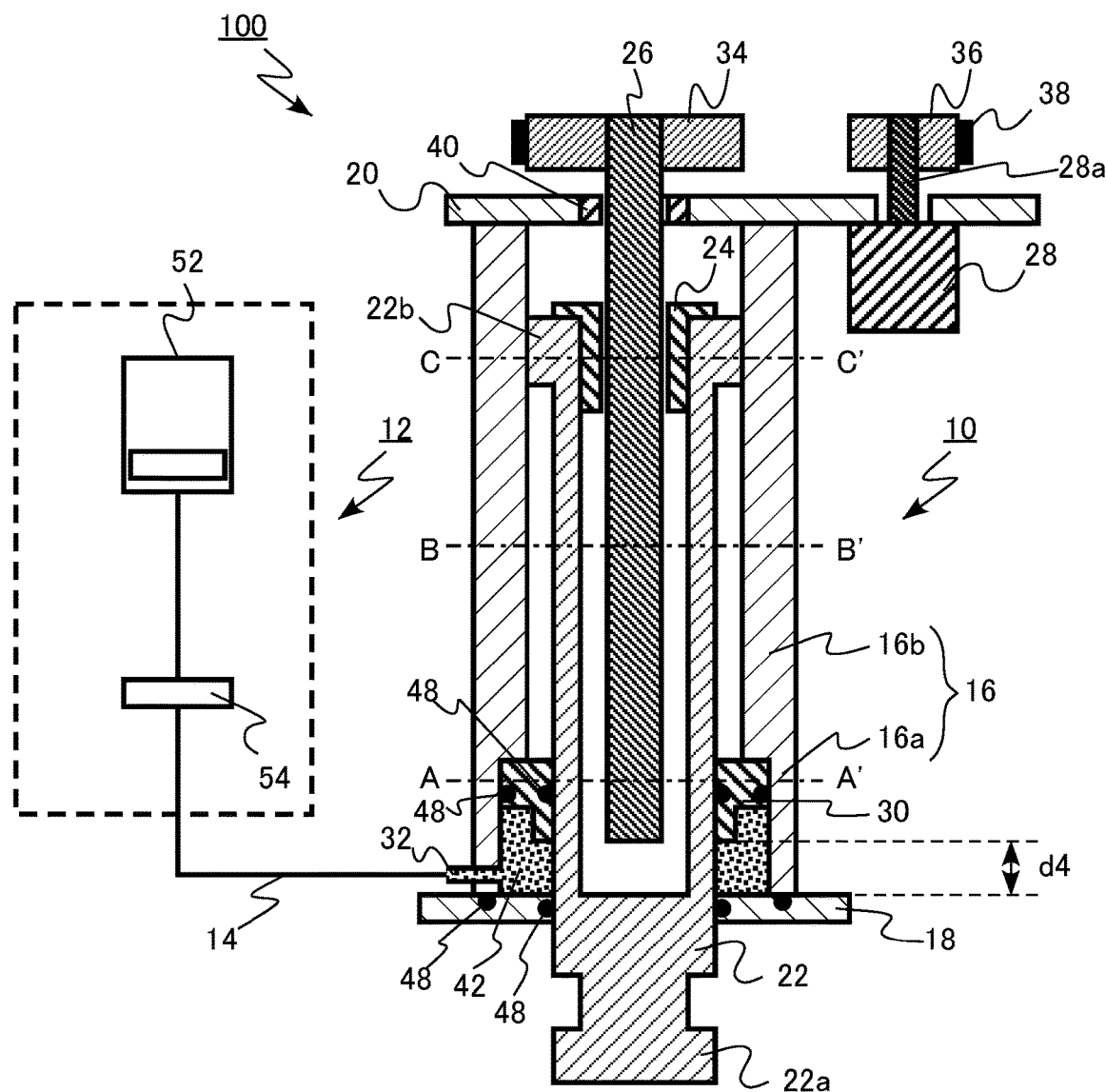
FIG. 3 is a schematic view of the hybrid core driving device of the first embodiment.

FIG. 3 is a schematic view of the hybrid core driving device of the first embodiment. FIG. 3 shows a cross-section of the cylinder unit 10 and a circuit configuration of the first hydraulic circuit 12.

Figure 4A:
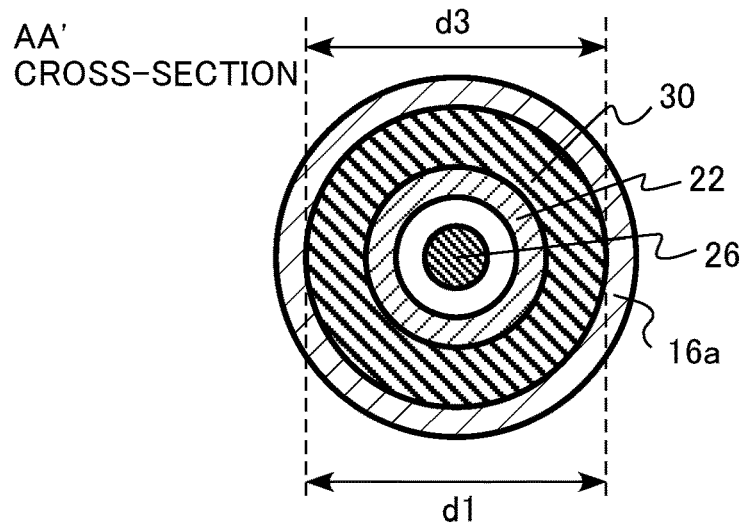
FIGS. 4A, 4B, and 4C are schematic views of the hybrid core driving device of the first embodiment.
Figure 4B:
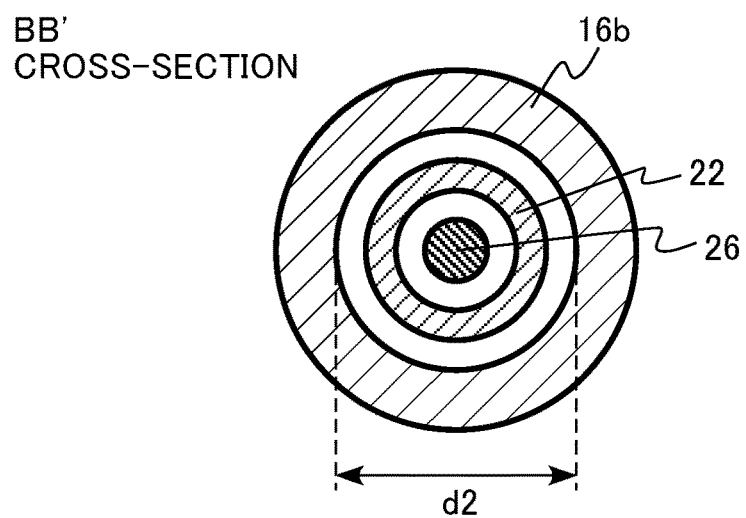
Figure 4C:
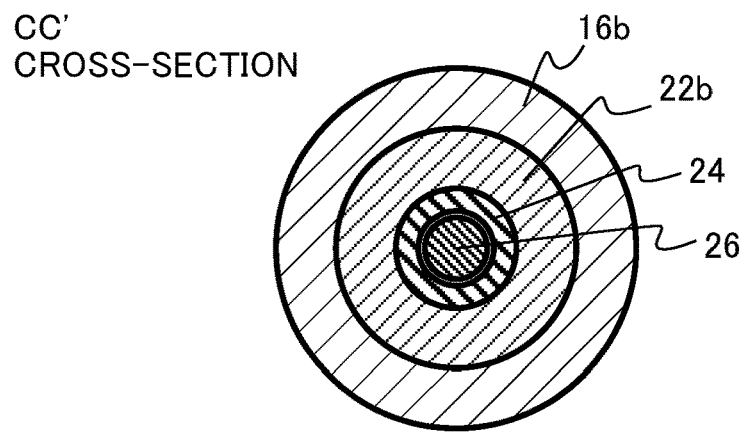

FIGS. 4A, 4B, and 4C are schematic views of the hybrid core driving device of the first embodiment. FIGS. 4A, 4B, and 4C show cross-sections of the cylinder unit 10. FIG. 4A shows a cross-section of AA' of FIG. 3, FIG. 4B shows a cross-section of BB' of FIG. 3, and FIG. 4C shows a cross-section of CC' of FIG. 3.

The cylinder unit 10 includes a cylinder tube 16, a head cover 18 (first cover member), a cap cover 20 (second cover member), a rod 22, a nut 24, a screw shaft 26, a motor 28, a piston 30, a pipe connection portion 32 (connection portion), a first pulley 34, a second pulley 36, a belt 38, a screw shaft guide 40, an oil chamber 42 (region), and a packing 48.

The cylinder tube 16 includes a first region 16a and a second region 16b. The rod 22 includes a coupling 22a (connecting portion) and a flange 22b. The motor 28 includes a motor shaft 28a.

The first hydraulic circuit 12 includes an accumulator 52 and a switching valve 54.

The cylinder unit 10 is an actuator that realizes a reciprocating linear motion using hydraulic pressure and electric power as energy sources.

The cylinder tube 16 has a cylindrical shape. The cylinder tube 16 includes a first region 16a and a second region 16b which have different inner diameters. The first inner diameter (d1 in FIG. 4A) of the first region 16a is larger than the second inner diameter (d2 in FIG. 4B) of the second region 16b. The thickness of the first region 16a is thinner than, for example, the thickness of the second region 16b.

The length of the cylinder tube 16 of the first region 16a in the extension direction is shorter than the length of the cylinder tube 16 of the second region 16b in the extension direction. The length of the cylinder tube 16 of the first region 16a in the extension direction is, for example, ⅕ or less of the length of the cylinder tube 16 of the second region 16b in the extension direction.

The head cover 18 is fixed to one end of the cylinder tube 16. The head cover 18 has an opening portion through which the rod 22 penetrates. The contact portion between the head cover 18 and the cylinder tube 16 is provided with, for example, a packing 48 for preventing the leakage of the hydraulic oil. For example, the head cover 18 and the cylinder tube 16 may be integrally molded with each other.

The cap cover 20 is fixed to the other end of the cylinder tube 16. The cap cover 20 is provided at the end on the side opposite to the head cover 18 of the cylinder tube 16. The cap cover 20 has an opening portion through which the screw shaft 26 penetrates. For example, the cap cover 20 and the cylinder tube 16 may be integrally molded with each other.

At least a part of the rod 22 is provided in the cylinder tube 16. The rod 22 includes a coupling 22a capable of connecting the core to one end. The rod 22 includes a coupling 22a capable of connecting the core to the head cover 18. For example, a fixing jig capable of fixing the core to the tip can be screwed to the coupling 22a.

The rod 22 includes a flange 22b on the side of the cap cover 20 of the coupling 22a. For example, the rod 22 includes a flange 22b at an end on the side of the cap cover 20. The flange 22b has an annular shape.

The rod 22 penetrates the head cover 18. The rod 22 is slidable with respect to the head cover 18. For example, the packing 48 for preventing the leakage of the hydraulic oil is provided at the contact portion between the rod 22 and the head cover 18.

At least a part of the rod 22 has a cylindrical shape. The rod 22 is movable straight with respect to the cylinder tube 16.

The nut 24 is fixed to the rod 22. The nut 24 is fixed to, for example, the end on the side of the cap cover 20 of the rod 22.

The screw shaft 26 penetrates the cap cover 20 and the nut 24. The screw shaft 26 is provided to be insertable into the rod 22. The screw shaft 26 is rotatable.

The screw shaft 26 and the nut 24 constitute, for example, a ball screw. A ball is provided between the screw shaft 26 and the nut 24 to reduce the frictional resistance between the screw shaft 26 and the nut 24.

The screw shaft guide 40 is provided between the cap cover 20 and the screw shaft 26. The screw shaft guide 40 is rotatably supported by the screw shaft 26. The screw shaft guide 40 is, for example, a ball bearing. The screw shaft guide 40 is, for example, a thrust bearing capable of receiving a force acting in the axial direction of the screw shaft 26.

The motor 28 is fixed to, for example, the cap cover 20. The motor 28 rotates the screw shaft 26. The motor 28 is a power source for rotating the screw shaft 26. The motor 28 is, for example, an induction motor that uses an AC power supply.

The first pulley 34 is fixed to the end of the screw shaft 26. The second pulley 36 is fixed to the motor shaft 28a of the motor 28. The first pulley 34 and the second pulley 36 are connected by the belt 38.

The rotation of the motor 28 is transmitted to the screw shaft 26 by using the first pulley 34, the second pulley 36, and the belt 38 so that the screw shaft 26 rotates. The ratio between the diameter of the first pulley 34 and the diameter of the second pulley 36 is determined so that the rotation speed of the screw shaft 26 becomes a desired rotation speed.

The piston 30 is provided on the side of the head cover 18 in the cylinder tube 16. The piston 30 is provided in the first region 16a of the cylinder tube 16.

The piston 30 has an annular shape. The rod 22 penetrates the piston 30. The piston 30 is slidable with respect to the cylinder tube 16 and the rod 22. The contact portion between the piston 30 and the cylinder tube 16 and the contact portion between the piston 30 and the rod 22 are provided with, for example, the packing 48 for preventing the leakage of the hydraulic oil.

The piston 30 is provided with an annular notch portion. The annular notch portion constitutes at least a part of the oil chamber 42.

The outer diameter (d3 in FIG. 4A) of the piston 30 is larger than the second inner diameter (d2 in FIG. 4B) of the second region 16b.

The movable distance (d4 in FIG. 3) of the piston 30 is, for example, 1 mm or more and 10 mm or less.

The oil chamber 42 is a region surrounded by the cylinder tube 16, the head cover 18, and the piston 30. The oil chamber 42 is filled with hydraulic oil.

The pipe connection portion 32 is provided in the cylinder tube 16. The pipe connection portion 32 is provided at, for example, the side surface on the side of the head cover 18 of the cylinder tube 16.

The pipe connection portion 32 communicates with the oil chamber 42. The pipe connection portion 32 is provided so that the pipe 14 is connectable thereto. The pipe 14 supplies hydraulic oil operating the piston 30 from the first hydraulic circuit 12 to the oil chamber 42. The shape of the pipe connection portion 32 may be, for example, a tubular shape extending laterally from the side surface of the cylinder tube 16 or an opening portion formed in the cylinder tube 16.

The first hydraulic circuit 12 is connected to the pipe 14 connected to the oil chamber 42.

The switching valve 54 controls the flow direction of the hydraulic oil flowing in the first hydraulic circuit 12. The switching valve 54 controls the supply of the hydraulic oil to the cylinder unit 10 and the return of the hydraulic oil from the cylinder unit 10. The opening and closing operation of the switching valve 54 is controlled, for example, in synchronization with the position of the rod 22. The switching valve 54 is, for example, a solenoid valve. The switching valve 54 may be, for example, a servo valve. Further, the switching valve 54 may be a switching valve having a flow rate adjusting function.

The accumulator 52 stores energy using a high-pressure enclosed gas and momentarily releases the energy to increase the flow rate of the hydraulic oil.

The first hydraulic circuit 12 does not include both a hydraulic pump and a tank storing oil. The first hydraulic circuit 12 has a so-called pumpless configuration. The amount of the hydraulic oil used in the first hydraulic circuit 12 is, for example, 1 L or more and 20 L or less.

Figure 5:
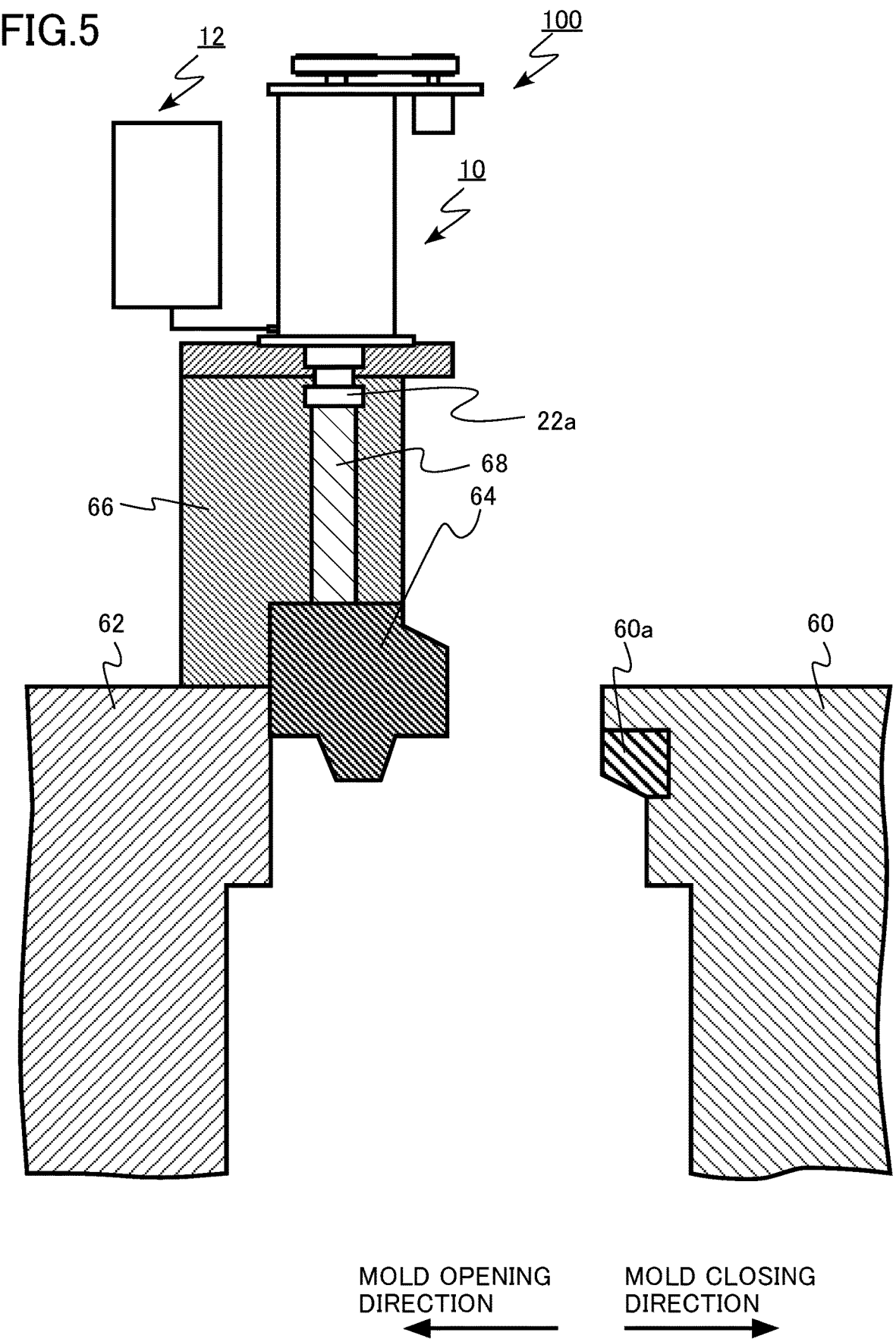
FIG. 5 is a diagram showing a state in which the hybrid core driving device of the first embodiment is fixed to a mold.
Figure 6:
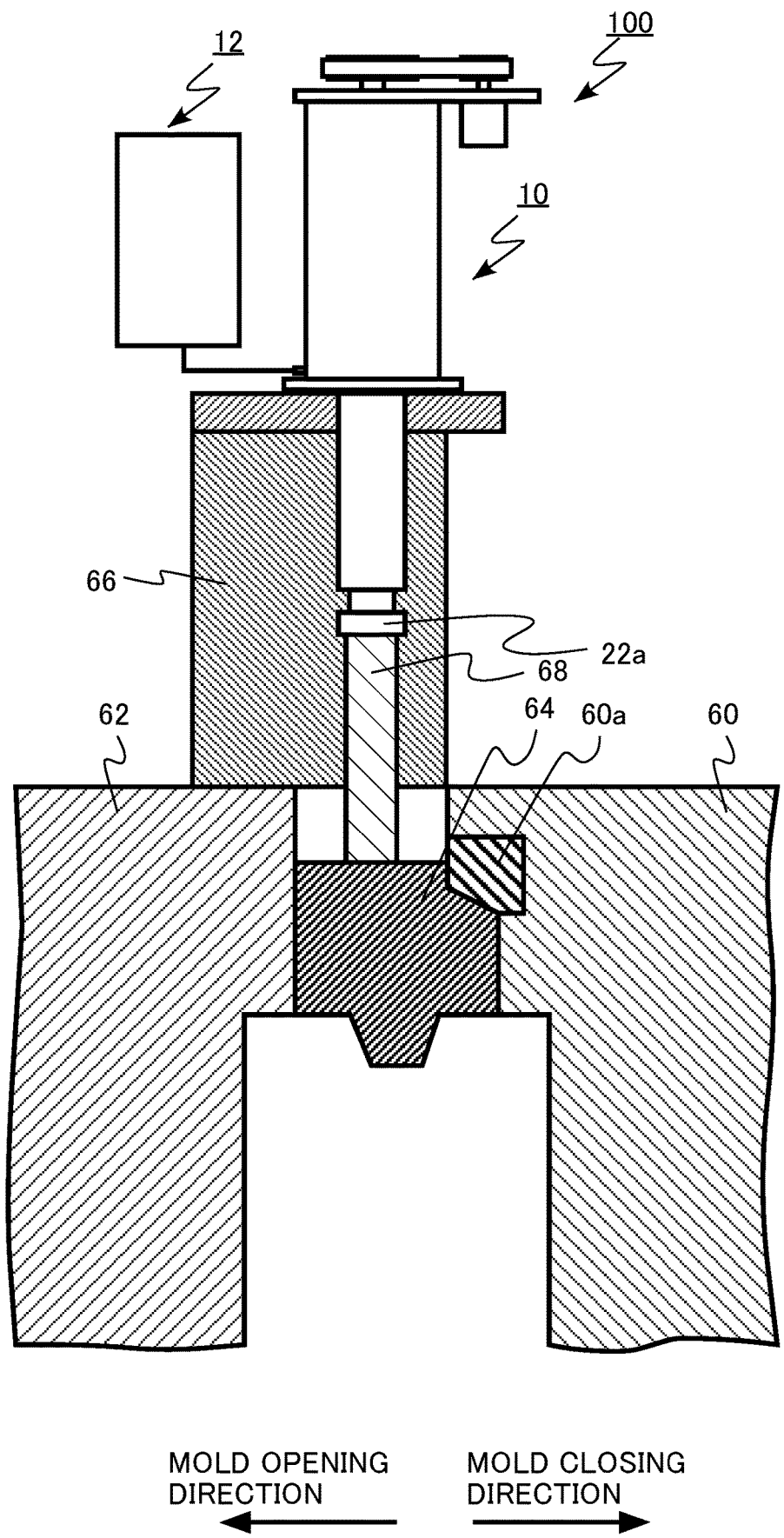
FIG. 6 is a diagram showing a state in which the hybrid core driving device of the first embodiment is fixed to the mold.

FIGS. 5 and 6 are diagrams showing a state in which the hybrid core driving device of the first embodiment is fixed to the mold. FIG. 5 is a diagram showing a state in which the mold is opened. FIG. 6 is a diagram showing a state in which the mold is closed. FIGS. 5 and 6 show a part of the mold.

The mold includes a fixed die 60, a movable die 62, and a core 64. The fixed die 60 is provided with, for example, a stopper 60a. The cylinder unit 10 of the hybrid core driving device 100 is fixed to, for example, the movable die 62 by a fixing base 66.

The core 64 is fixed to the cylinder unit 10 of the hybrid core driving device 100. For example, a fixing jig 68 fixing the core is screwed to the coupling 22a of the cylinder unit 10.

As shown in FIG. 6, in the mold closed state, the core 64 is assembled between the fixed die 60 and the movable die 62. The stopper 60a prevents the core 64 from being extruded by the pressure of the molten metal filled in the cavity in the mold. For the stopper 60a, for example, a material having a hardness higher than that of other regions of the fixed die 60 is used.

Next, the operation of the hybrid core driving device 100 will be described. FIGS. 7, 8, 9, 10, 11, and 12 are explanatory diagrams of the operation of the hybrid core driving device of the first embodiment.

Figure 7:
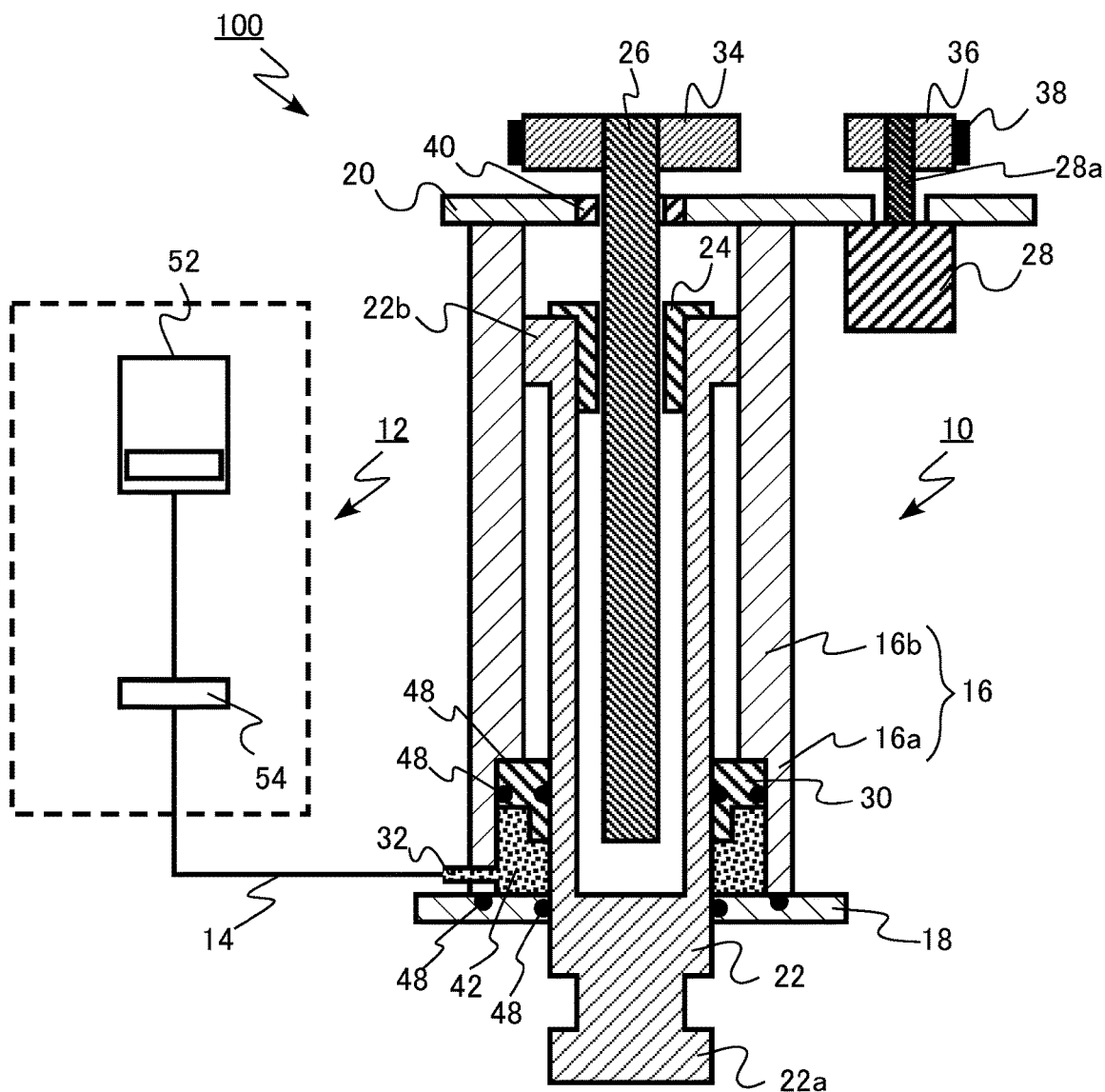
FIG. 7 is an explanatory diagram of an operation of the hybrid core driving device of the first embodiment.

FIG. 7 shows a state in which the rod 22 is located at a backward limit position. That is, FIG. 7 shows a case in which the rod 22 is located at a position closest to the cap cover 20.

When the rod 22 is located at the backward limit position, the oil chamber 42 is filled with the hydraulic oil. In this case, the accumulator 52 of the first hydraulic circuit 12 is not filled with the hydraulic oil. The piston 30 is located at a position closest to the cap cover 20. In this case, the end on the side of the cap cover 20 of the piston 30 is in contact with the second region 16b of the cylinder tube 16.

Figure 8:
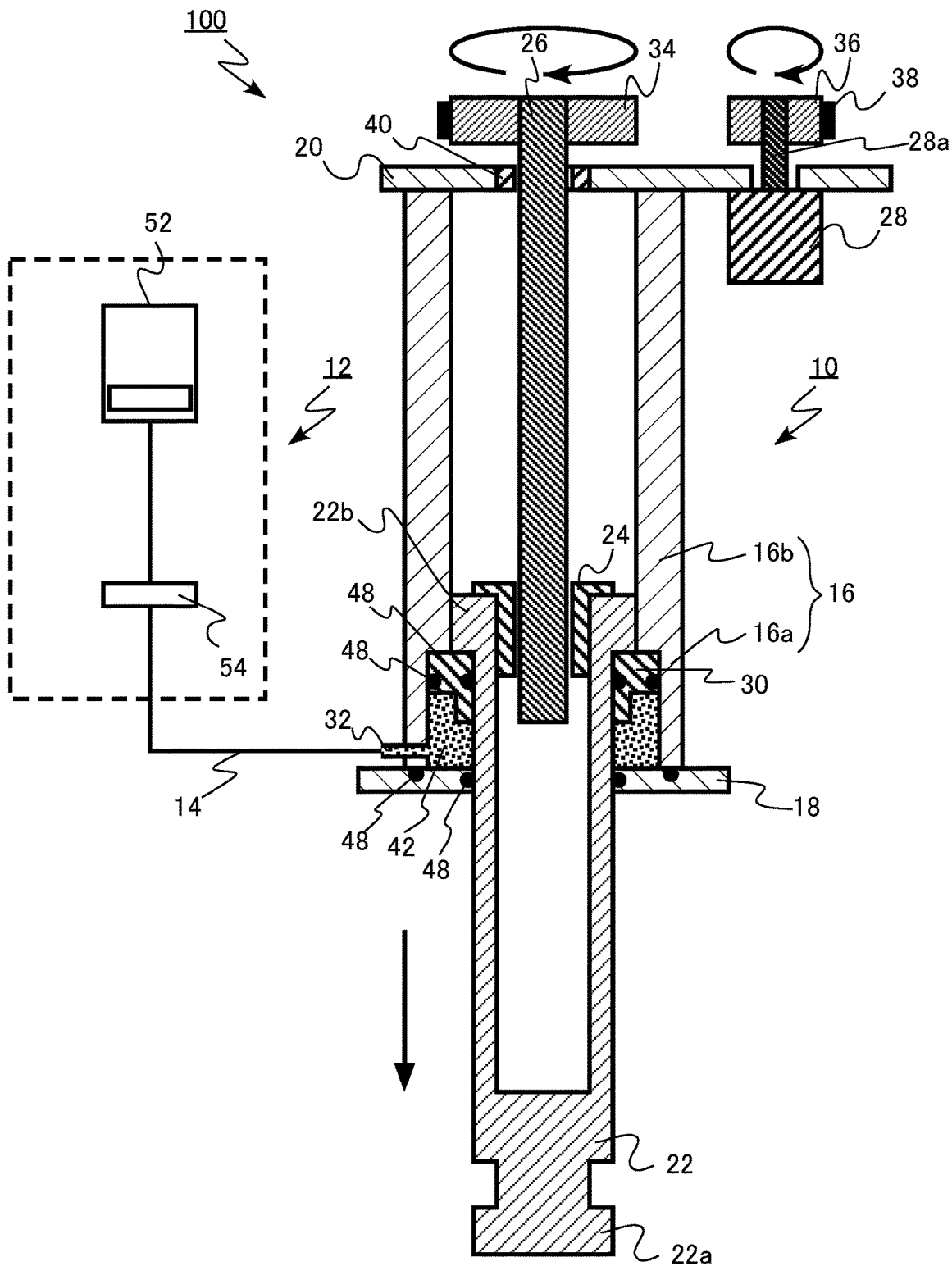
FIG. 8 is an explanatory diagram of the operation of the hybrid core driving device of the first embodiment.

As shown in FIG. 8, when the motor 28 is driven, the motor shaft 28a rotates and the second pulley 36 rotates. The rotation of the second pulley 36 is transmitted to the first pulley 34 by the belt 38 so that the first pulley 34 rotates. When the first pulley 34 rotates, the screw shaft 26 rotates.

Figure 9:
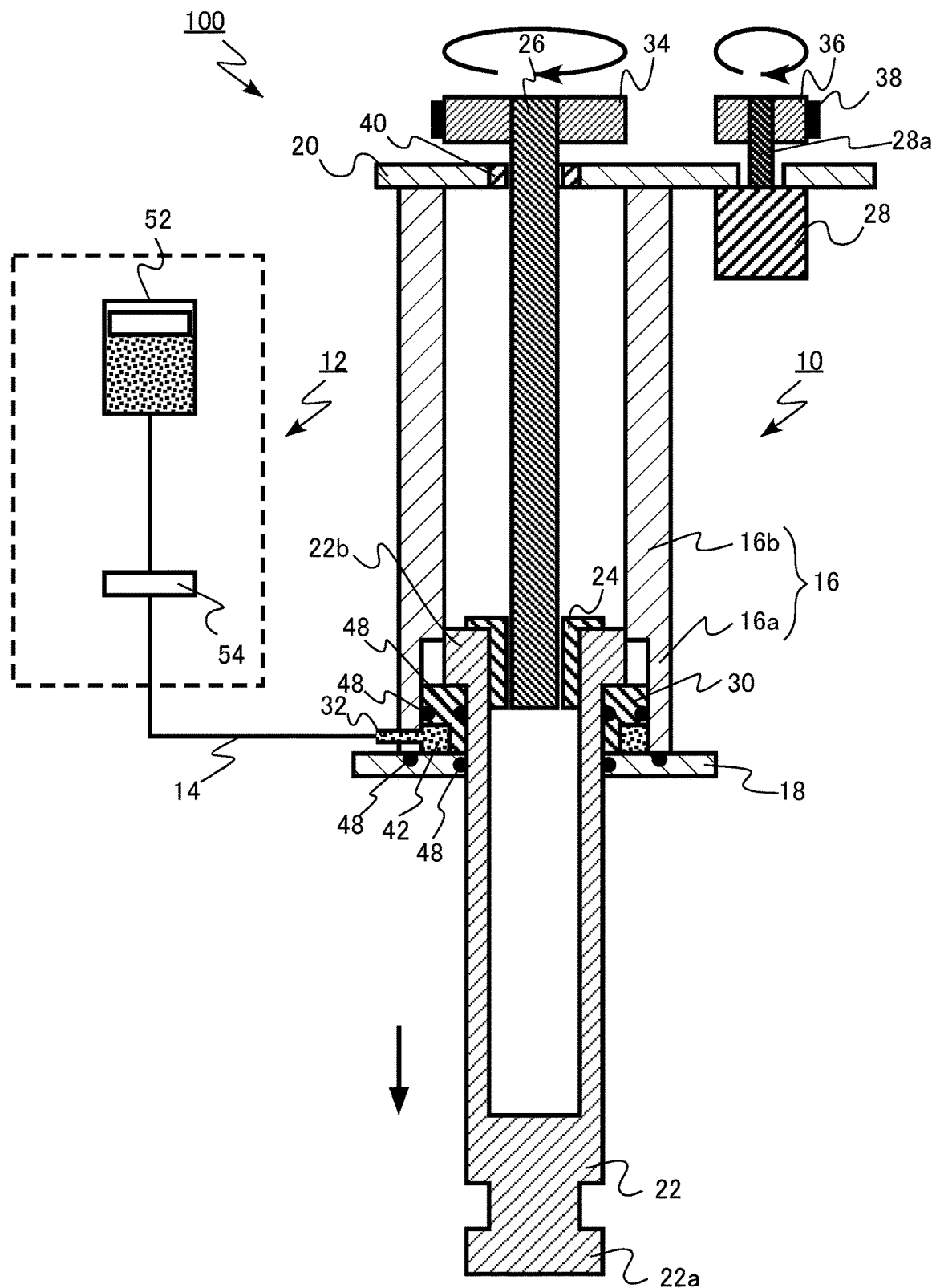
FIG. 9 is an explanatory diagram of the operation of the hybrid core driving device of the first embodiment.

The rotational movement of the screw shaft 26 is converted into the linear movement by the nut 24 and the rod 22 advances toward the head cover 18. After the rod 22 advances by a predetermined distance, the flange 22b of the rod 22 contacts the end on the side of the cap cover 20 of the piston 30. Then, as shown in FIG. 9, the piston 30 is pressed forward by the flange 22b of the rod 22 and is stopped when contacting the head cover 18.

When the rod 22 and the piston 30 advance, the hydraulic oil of the oil chamber 42 is extruded by the pipe 14 so that the accumulator 52 is filled with the hydraulic oil. The switching valve 54 is operated in conjunction with the advancement of the piston 30 and the hydraulic oil flows from the pipe 14 to the accumulator 52.

Figure 10:
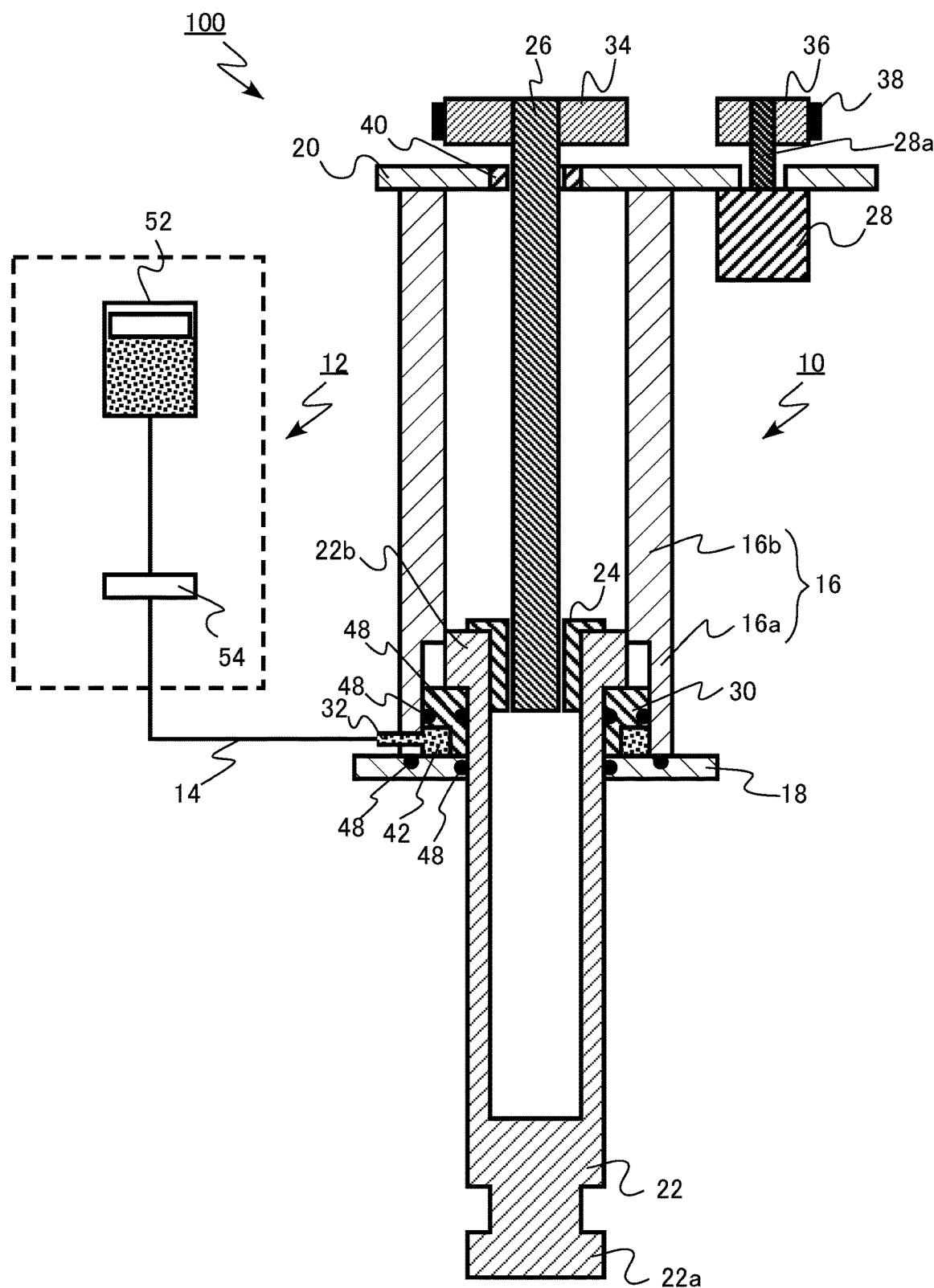
FIG. 10 is an explanatory diagram of the operation of the hybrid core driving device of the first embodiment.

FIG. 10 shows a state in which the rod 22 is located at a forward limit position. That is, FIG. 10 shows a case in which the rod 22 is located at a position farthest from the cap cover 20.

Figure 11:
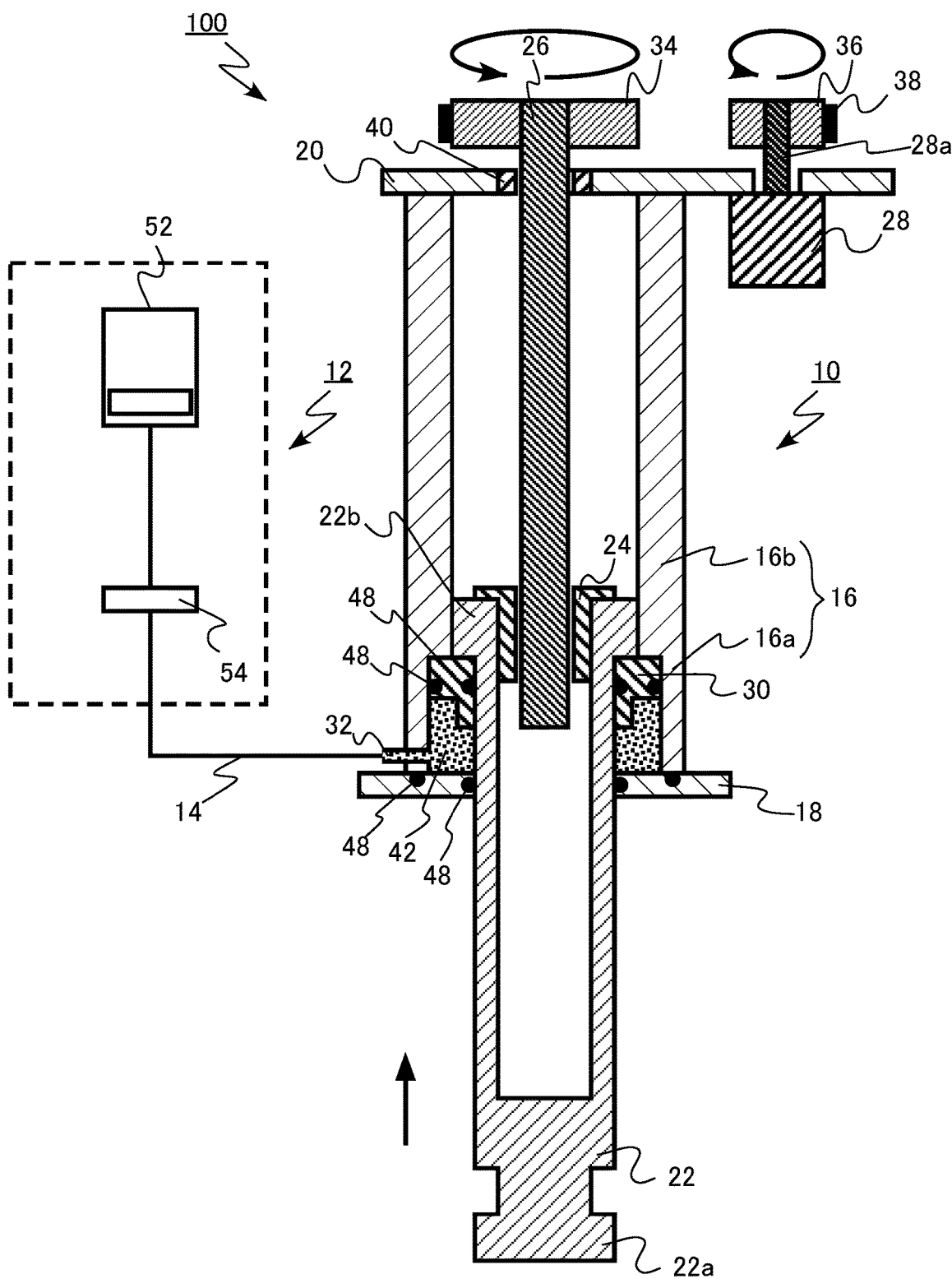
FIG. 11 is an explanatory diagram of the operation of the hybrid core driving device of the first embodiment.

As shown in FIG. 11, the piston 30 is retracted by the hydraulic pressure by operating the accumulator 52 to fill the oil chamber 42 with the hydraulic oil. The flange 22b of the rod 22 is pressed upward by the piston 30 so that the rod 22 is retraced. The retraction distance of the piston 30 is, for example, 1 mm or more and 10 mm or less.

As shown in FIG. 11, the accumulator 52 is operated to fill the oil chamber 42 with the hydraulic oil and drive the motor 28. The rod 22 is retracted by the driving of the motor 28. In this case, the rod 22 is retracted by using both hydraulic energy and electric power energy.

Additionally, it is also possible to retract the rod 22 only by using the hydraulic energy without driving the motor 28 until the piston 30 is retracted and stopped.

Figure 12:
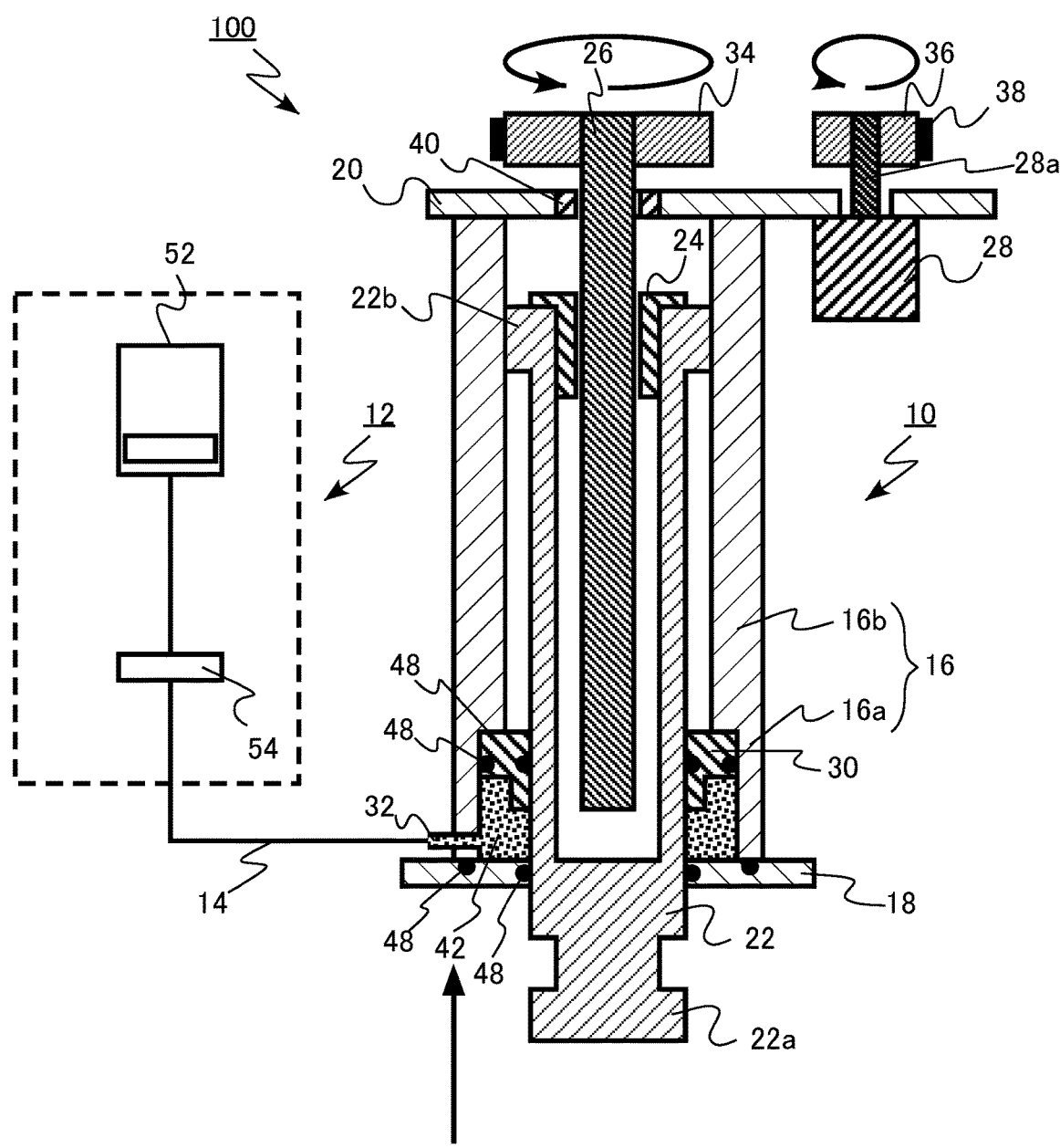
FIG. 12 is an explanatory diagram of the operation of the hybrid core driving device of the first embodiment.

As shown in FIG. 12, the rod 22 is retracted by the driving of the motor 28 after the piston 30 is stopped. Then, when the rod 22 reaches the backward limit position, the driving of the motor 28 is stopped.

Next, the function and effect of the hybrid core driving device 100 of the first embodiment will be described.

When using a mold having a core, the core driving device for inserting the core into the fixed die or the movable die and pulling out the core from the fixed die or the movable die is provided. When pulling out the core from the fixed die or the movable die, the core driving device requires a large driving force in order to pull the core away from a product. Then, it is preferable to rapidly retract the core in order to shorten the cycle time of the die casting machine after the core is pulled away from the product.

The hybrid core driving device 100 of the first embodiment is a hybrid core driving device that uses both a hydraulic drive and an electric power drive. In the initial stage when the core is pulled out, the cylinder unit 10 is hydraulically driven by using the first hydraulic circuit 12. When the cylinder unit 10 is hydraulically driven, it is possible to obtain a large driving force required for pulling the core away from the product.

Since the first hydraulic circuit 12 is used only for pulling the core away, for example, the capacity of the accumulator 52 can be decreased. Thus, it is possible to realize a remarkable decrease in the amount of the hydraulic oil used in the hybrid core driving device 100.

Further, the accumulator 52 is filled with the hydraulic oil when the rod 22 and the piston 30 advance. In other words, the first hydraulic circuit 12 does not require a hydraulic pump or a tank storing oil.

Further, since a remarkable decrease in the amount of the hydraulic oil can be realized and the hydraulic pump or the tank is not necessary, it is possible to suppress the deterioration of the work environment due to oil stains. Further, the risk of fire due to oil leaks is reduced.

Further, since the capacity of the accumulator 52 can be decreased and the hydraulic pump or the tank is not necessary, it is possible to decrease the size of the first hydraulic circuit 12. Thus, it is possible to realize the simplification of the structure of the hybrid core driving device 100. From the viewpoint of a decrease in size of the first hydraulic circuit 12, the movable distance (d4 in FIG. 3) of the piston 30 is preferably 10 mm or less.

Further, since the first hydraulic circuit 12 does not require the hydraulic pump or the tank, it is possible to realize the energy saving of the hybrid core driving device 100. Further, since the first hydraulic circuit 12 does not require the hydraulic pump or the tank, it is possible to allow the first hydraulic circuit 12 and the hydraulic circuit of the mold clamping device to be independent from each other.

In the hybrid core driving device 100, the motor 28 is used to drive the cylinder unit 10 with electric power after the core is pulled away. It is possible to rapidly retract the core by driving the cylinder unit 10 with electric power. Since a large driving force is not necessary for the motor 28, it is possible to decrease the size of the motor 28.

Since the motor 28 can be decreased in size, it is possible to realize the simplification of the structure of the hybrid core driving device 100. Further, it is possible to save energy due to a decrease in size of the motor 28.

Since the hybrid core driving device 100 performs both the hydraulic drive and the electric power drive, the simplification of the structure of the device is realized.

Further, the hybrid core driving device 100 can insert the core into the fixed die or the movable die and pull out the core from the fixed die or the movable die by the driving using the motor 28 at the same time as the opening and closing of the fixed die and the movable die. Thus, it is possible to shorten the cycle time of the die casting machine using the hybrid core driving device 100. That is, it is possible to shorten the cycle time of manufacturing the product by the die casting machine using the hybrid core driving device 100.

Particularly, since the first hydraulic circuit 12 is independent from the hydraulic circuit of the mold clamping device performing the opening and closing operation of the fixed die and the movable die, it is possible to drive the cylinder unit 10 using the first hydraulic circuit 12 at the initial stage when the core is pulled out at the same time as the opening and closing of the fixed die and the movable die and further shorten the cycle time of the die casting machine.

In the hybrid core driving device 100 of the first embodiment, it is possible to save energy by performing a part of the drive using electric power, for example, compared to the case of using the hydraulic circuit for all drive.

Modified Example

Figure 13:
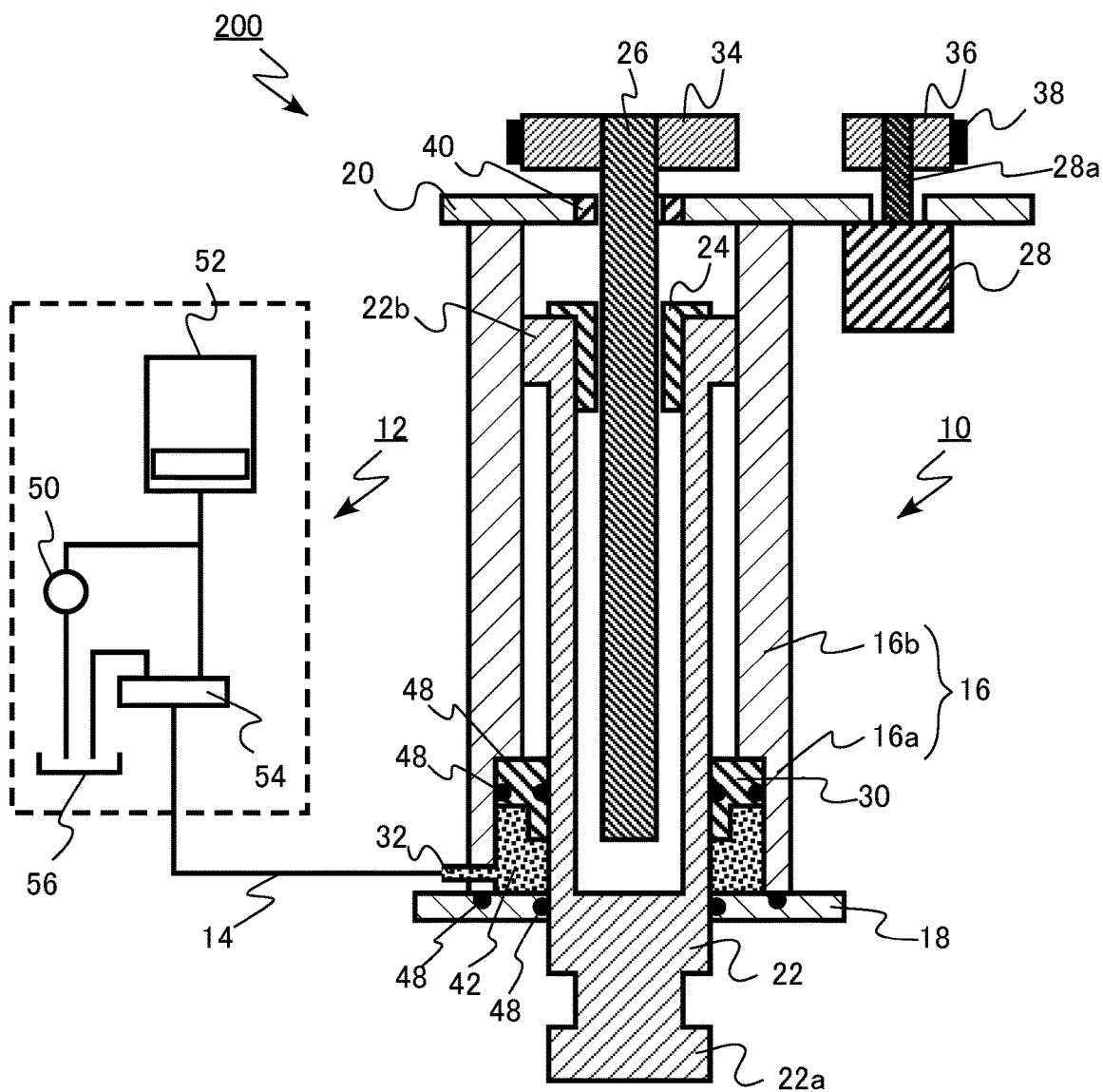
FIG. 13 is a schematic view of a hybrid core driving device of a modified example of the first embodiment.

FIG. 13 is a schematic view of a hybrid core driving device of a modified example of the first embodiment. In a hybrid core driving device 200 of the modified example, the first hydraulic circuit 12 further includes a hydraulic pump 50 and a tank 56.

It is possible to replenish the hydraulic oil into the first hydraulic circuit 12 by the hydraulic pump 50. For example, the hydraulic oil decreased by the leakage from the first hydraulic circuit 12 is replenished by the hydraulic pump 50. The hydraulic oil is stored in the tank 56. The amount of the hydraulic oil stored in the tank 56 is, for example, 1 L or more and 20 L or less.

As described above, according to the first embodiment, since both the hydraulic drive and the electric power drive are performed, it is possible to realize the hybrid core driving device capable of remarkably decreasing hydraulic oil, simplifying a device, saving energy, suppressing deterioration of a working environment due to oil stains, and shortening a cycle time of a molding machine.

Second Embodiment

A molding machine of a second embodiment includes: a base; a fixed die plate fixed onto the base and holding a fixed die; a movable die plate provided on the base to be movable in a mold opening and closing direction and holding a movable die to face the fixed die; a hybrid core driving device driving a core combined with the fixed die and the movable die; a mold clamping device clamping the fixed die and the movable die; an injection device filling a molten material into a cavity formed by the fixed die, the movable die, and the core; and a control circuit controlling an operation of the hybrid core driving device, wherein the hybrid core driving device includes: a cylinder tube, a first cover member fixed to one end of the cylinder tube, a second cover member fixed to the other end of the cylinder tube, a rod provided in the cylinder tube so that at least a part is provided in the cylinder tube, having a connecting portion provided at one end to be connectable to the core and an annular flange provided on the side of the second cover member in relation to the connecting portion, penetrating the first cover member, and movable straight with respect to the cylinder tube, a nut fixed to the rod, a screw shaft penetrating the second cover member and the nut and provided to be insertable into the rod and to be rotatable, a motor rotating the screw shaft, an annular piston provided in the cylinder tube, allowing the rod to penetrate therethrough, and slidable with respect to the cylinder tube and the rod, and a connection portion provided in the cylinder tube and connectable to a pipe supplying a hydraulic liquid operating the piston to a region surrounded by the cylinder tube, the first cover member, and the piston. The hybrid core driving device of the molding machine of the second embodiment is the same as the hybrid core driving device of the first embodiment. Hereinafter, some descriptions of the contents overlapping with the first embodiment will be omitted.

Figure 14:
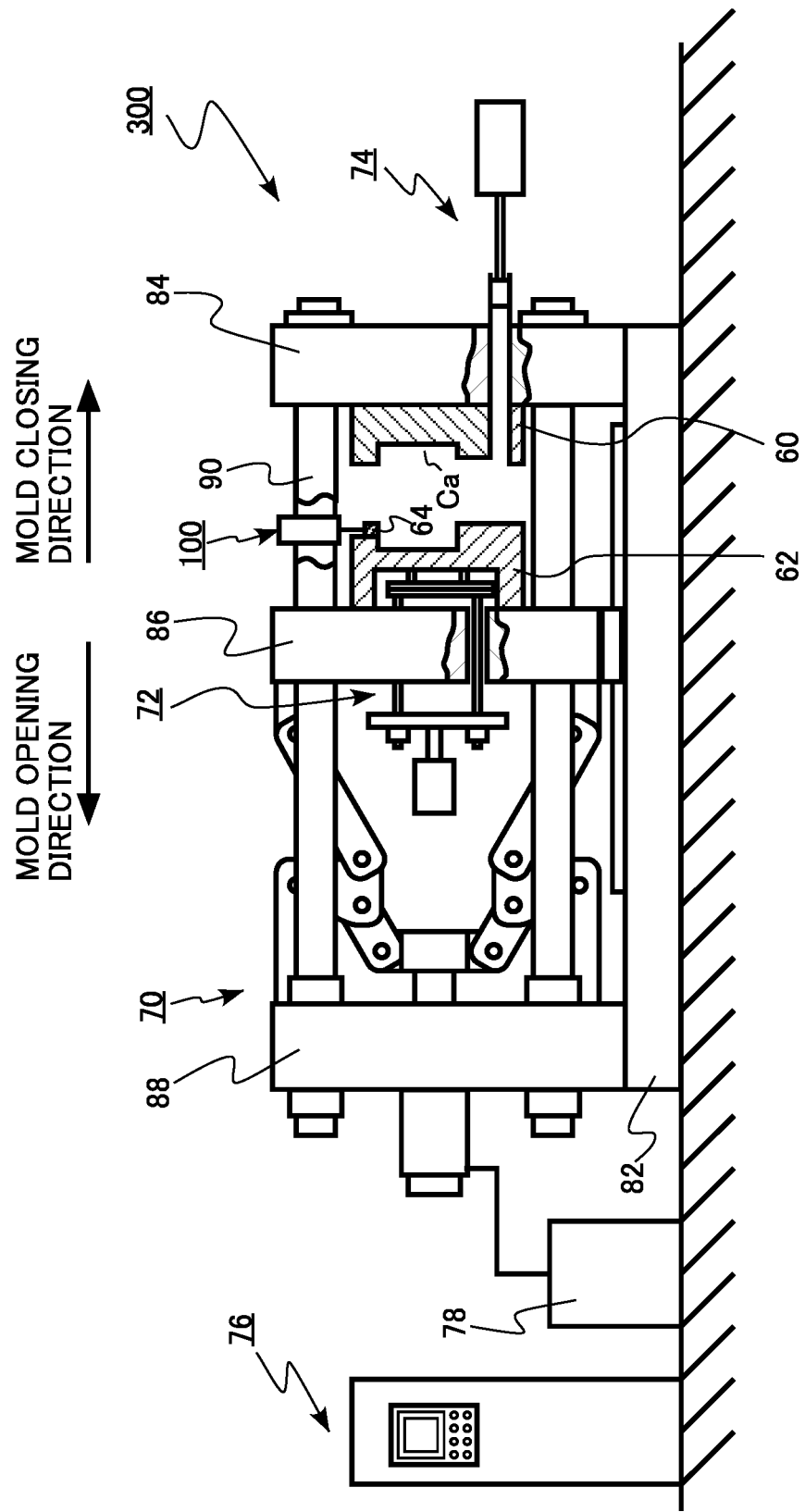
FIG. 14 is a schematic view showing an entire configuration of a molding machine of a second embodiment.

FIG. 14 is a schematic view showing an entire configuration of the molding machine of the second embodiment. FIG. 14 is a side view including a cross-sectional view in part. The molding machine of the second embodiment is a die casting machine 300. The die casting machine 300 is a cold chamber type die casting machine.

The die casting machine 300 includes a fixed die 60, a movable die 62, a core 64, a mold clamping device 70, an extrusion device 72, an injection device 74, a control unit 76, a second hydraulic circuit 78 (second liquid pressure circuit), and a hybrid core driving device 100. The die casting machine 300 includes a base 82, a fixed die plate 84, a movable die plate 86, a link housing 88, and a tie bar 90.

The die casting machine 300 injects and fills a molten metal (molten material) which is a liquid metal to the inside (a cavity Ca in FIG. 14) of the mold formed by the fixed die 60, the movable die 62, and the core 64. Then, the molten metal is solidified in the mold to manufacture a die-cast product. The metal is, for example, aluminum, an aluminum alloy, a zinc alloy, or a magnesium alloy.

The mold includes the fixed die 60, the movable die 62, and the core 64. The mold is provided between the mold clamping device 70 and the injection device 74. The core 64 is assembled to the fixed die 60 and the movable die 62.

The fixed die plate 84 is fixed onto the base 82. The fixed die plate 84 can hold the fixed die 60.

The movable die plate 86 is provided on the base 82 to be movable in the mold opening and closing direction. The mold opening and closing direction means both the mold opening direction and the mold closing direction shown in FIG. 14. The movable die plate 86 can hold the movable die 62 to face the fixed die 60.

The link housing 88 is provided on the base 82. One end of a link mechanism constituting the mold clamping device 70 is fixed to the link housing 88.

The fixed die plate 84 and the link housing 88 are fixed by the tie bar 90. The tie bar 90 supports a mold clamping force while the mold clamping force is applied to the fixed die 60 and the movable die 62.

The mold clamping device 70 has a function of opening and closing the mold and clamping the mold. The injection device 74 has a function of injecting a molten metal into the cavity Ca of the mold and pressurizing the molten metal. The extrusion device 72 has a function of extruding the manufactured die-cast product from the mold.

The hybrid core driving device 100 has a function of inserting the core 64 into the fixed die 60 or the movable die 62 and pulling out the core 64 from the fixed die 60 or the movable die 62. The hybrid core driving device 100 includes a cylinder unit 10 and a first hydraulic circuit 12.

The second hydraulic circuit 78 has a function of driving, for example, the mold clamping device 70, the extrusion device 72, and the injection device 74 by a hydraulic pressure. The second hydraulic circuit 78 is provided independently from the first hydraulic circuit 12 of the hybrid core driving device 100.

The second hydraulic circuit 78 includes a tank (not shown). The amount of the hydraulic oil stored in the tank of the second hydraulic circuit 78 is larger than the amount of the hydraulic oil stored in the tank 56 of the first hydraulic circuit 12. In other words, the amount of the hydraulic oil used in the second hydraulic circuit 78 is larger than the amount of the hydraulic oil used in the first hydraulic circuit 12.

The amount of the hydraulic oil used in the second hydraulic circuit 78 is, for example, 100 times or more and 500 times or less the amount of the hydraulic oil used in the first hydraulic circuit 12. The amount of the hydraulic oil used in the first hydraulic circuit 12 is, for example, 100 L or more and 1000 L or less.

The control unit 76 has, for example, a function of controlling the mold clamping device 70, the extrusion device 72, the injection device 74, and the hybrid core driving device 100. For example, the control unit 76 controls the mold clamping device 70 and the hybrid core driving device 100 so that the movable die 62 and the core 64 move at the same time.

The control unit 76 has a function of performing various calculations and outputting a control command to each part of the die casting machine 300. The control unit 76 has, for example, a function of storing a molding condition and the like.

The control unit 76 has, for example, a combination of hardware and software. The control unit 76 includes, for example, a CPU (Central Processing Unit), a semiconductor memory, and a control program stored in the semiconductor memory. The control unit 76 may be a control circuit. The control unit 76 may be an electronic circuit.

Next, an example of the molding operation of the die casting machine 300 will be described.

Figure 15:
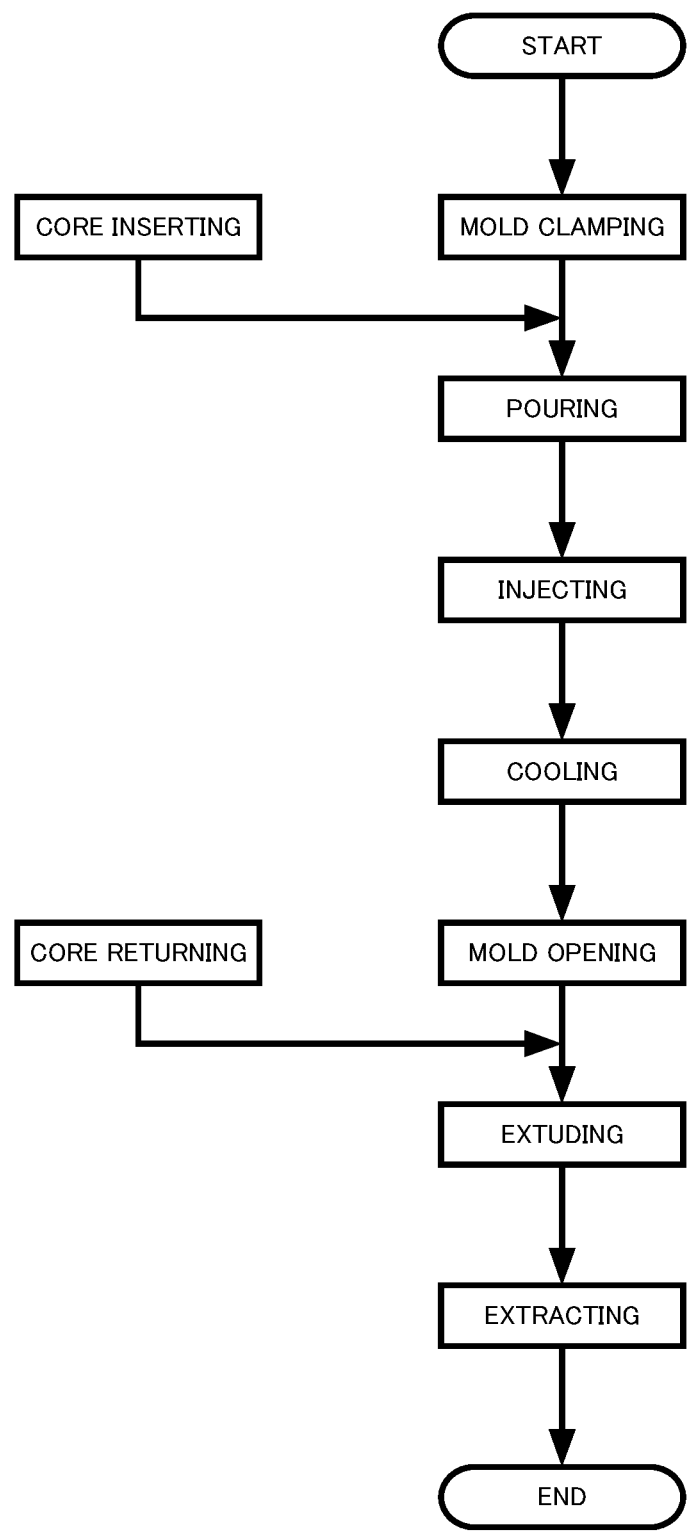
FIG. 15 is a flowchart showing a molding operation of the molding machine of the second embodiment.

FIG. 15 is a flowchart showing a molding operation of the molding machine of the second embodiment.

The molding operation of the die casting machine 300 includes a plurality of partial operations between the start and the end of the molding operation. For example, as shown in FIG. 15, the partial operations include, a "core inserting operation", a "mold clamping operation", a "pouring operation", an "injecting operation", a "cooling operation", a "mold opening operation", a "core returning operation", an "extruding operation", and an "extracting operation".

FIGS. 16, 17, 18, 19, 20, 21, 22, 23, 24, 25, and 26 are explanatory diagrams of the operation of the molding machine of the second embodiment. FIGS. 16, 17, 18, 19, 20, 21, 22, 23, 24, 25, and 26 particularly show the operations of the fixed die 60, the movable die 62, and the core 64. In FIGS. 16, 17, 18, 19, 20, 21, 22, 23, 24, 25, and 26, the first hydraulic circuit 12 of the hybrid core driving device 100 is not shown.

Figure 16:
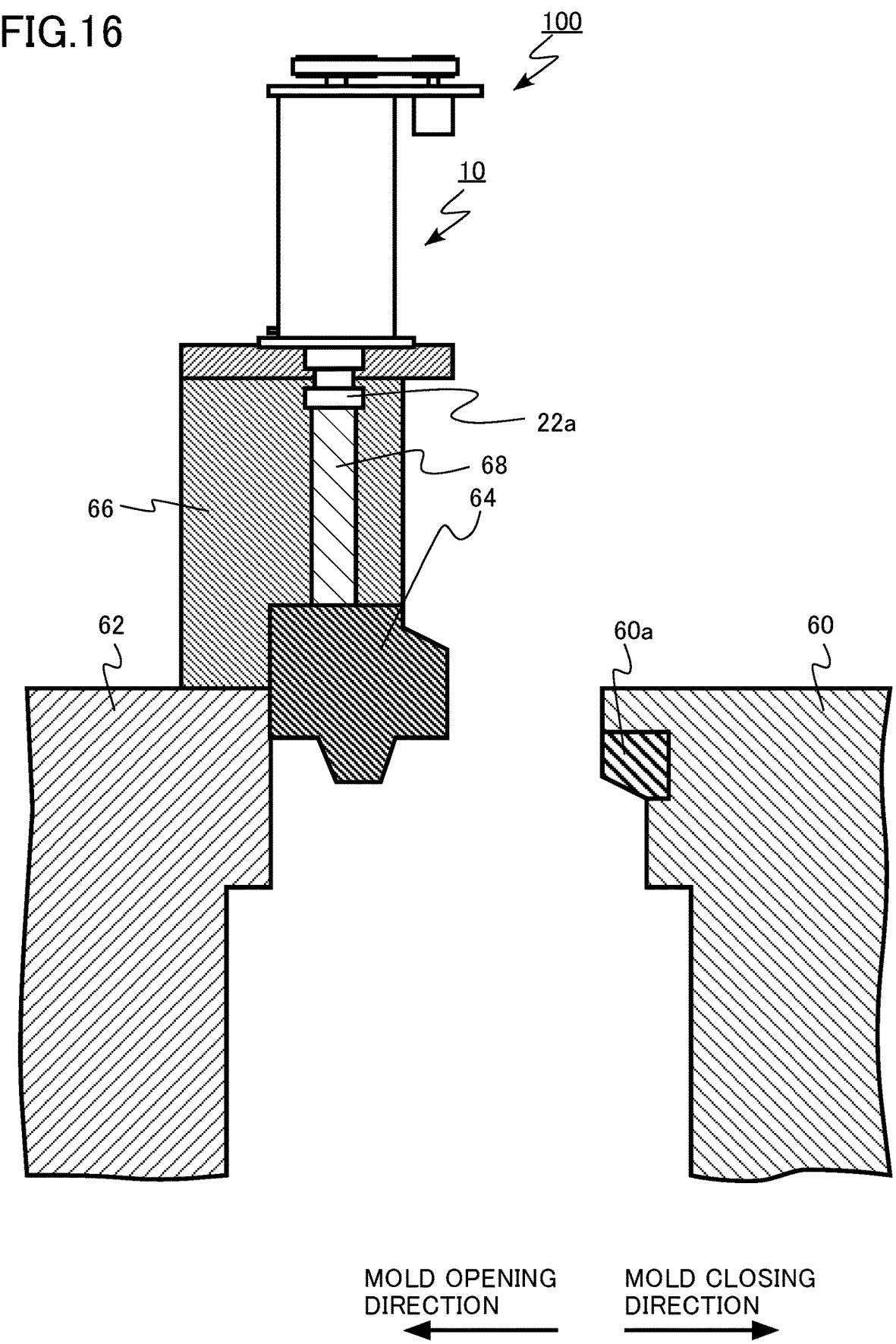
FIG. 16 is an explanatory diagram of an operation of the molding machine of the second embodiment.

At the time of starting the molding operation, the fixed die 60 and the movable die 62 are in the open state as shown in FIG. 16. The core 64 is in a state of being pulled out from the movable die 62.

The "core inserting operation" is an operation of inserting the core 64 into the movable die 62 using the hybrid core driving device 100. The "mold closing operation" is an operation of closing the fixed die 60 and the movable die 62 in the mold closing direction and tightening the fixed die 60 and the movable die 62 using the mold clamping device 70.

Figure 17:
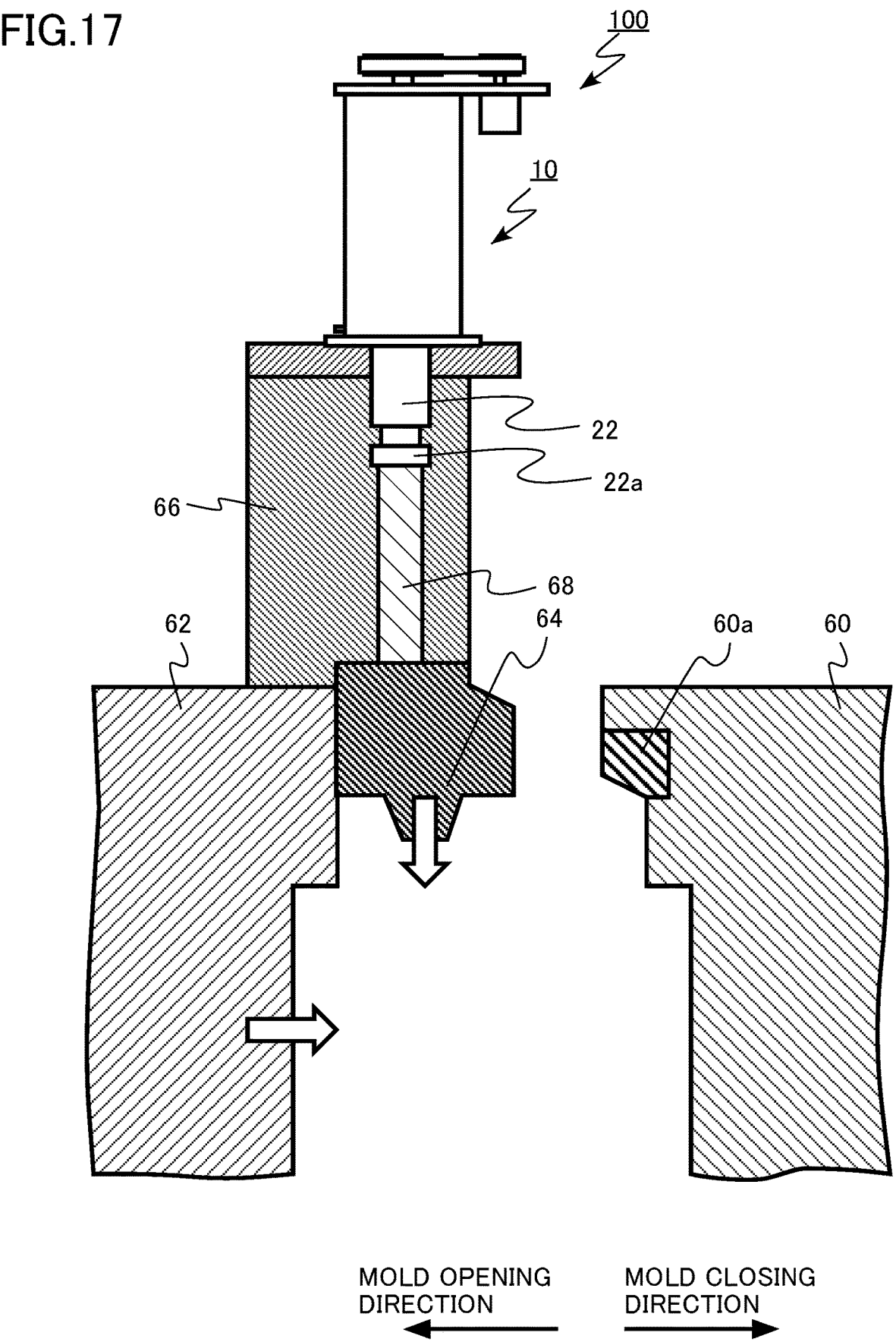
FIG. 17 is an explanatory diagram of the operation of the molding machine of the second embodiment.
Figure 18:
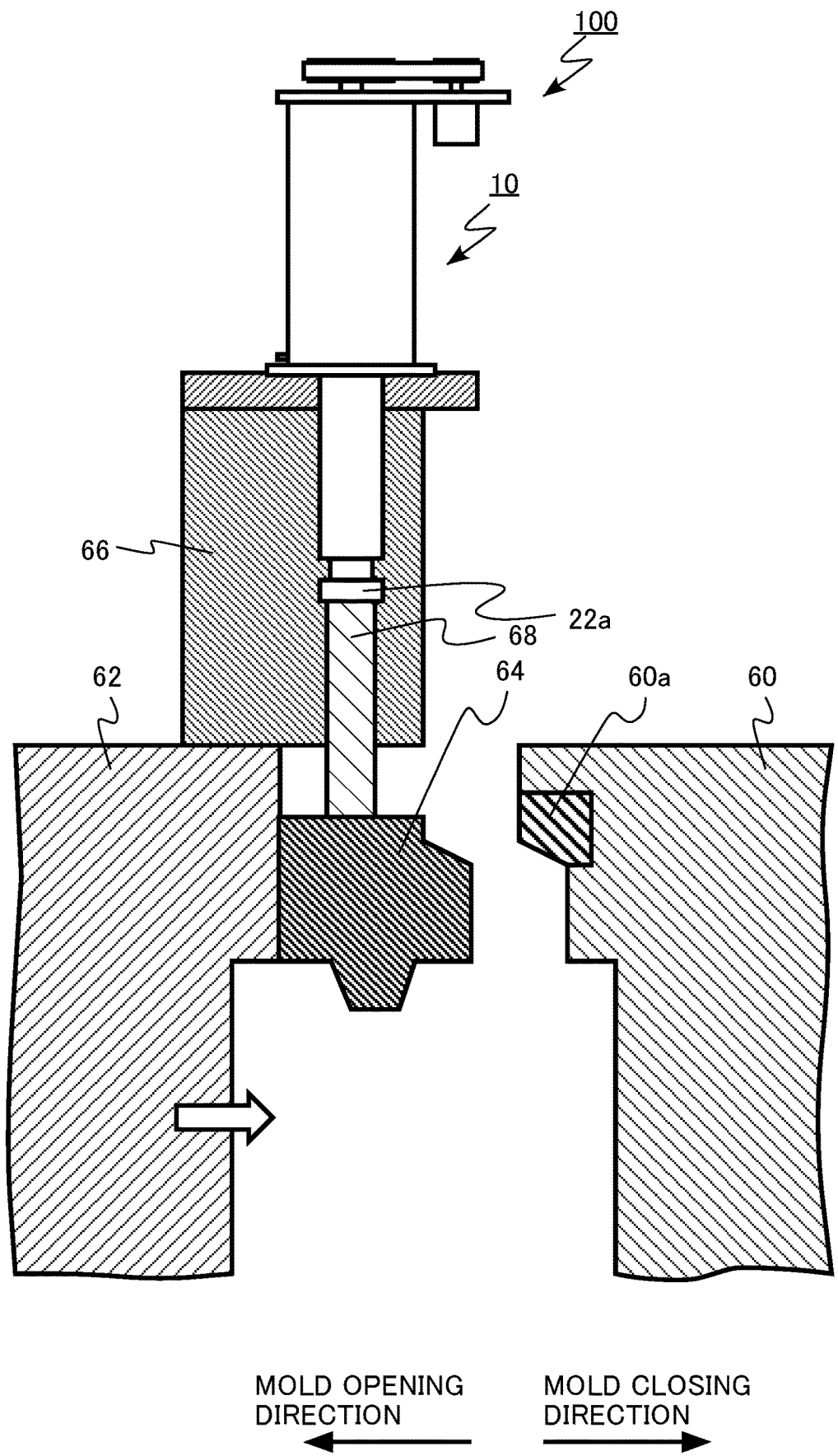
FIG. 18 is an explanatory diagram of the operation of the molding machine of the second embodiment.
Figure 19:
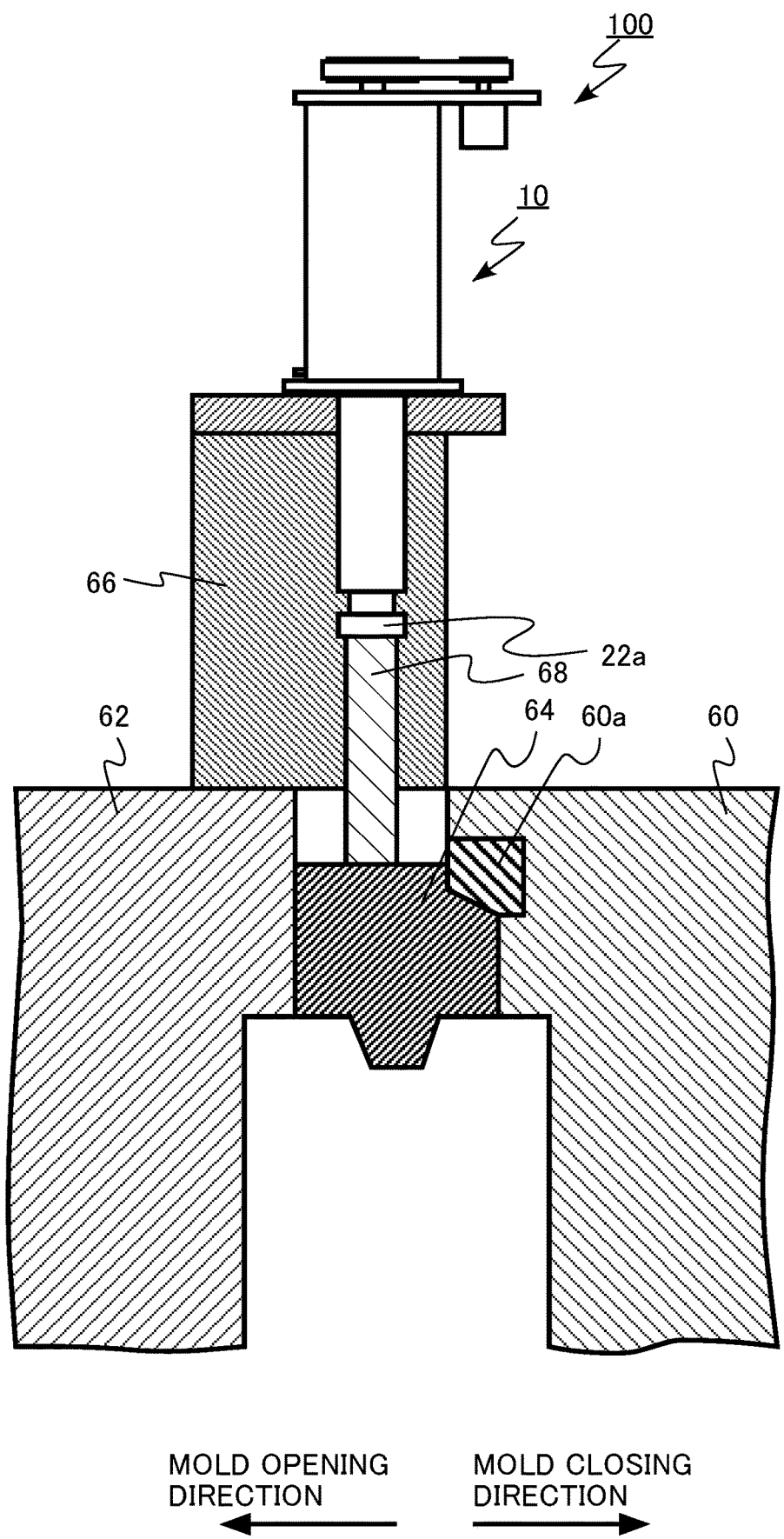
FIG. 19 is an explanatory diagram of the operation of the molding machine of the second embodiment.

At least a part of the operations of the "core inserting operation" and the "mold closing operation" are performed at the same time. FIGS. 17, 18, and 19 show the operations until the "core inserting operation" and the "mold closing operation" end.

As shown in FIG. 17, the fixed die 60 and the movable die 62 are closed in the mold closing direction by moving the movable die 62 using the mold clamping device 70. At the same time as this operation, the core 64 is inserted into the movable die 62 using the hybrid core driving device 100. The inserting of the core 64 is performed by driving the motor 28 of the hybrid core driving device 100 so that the rod 22 advances.

As shown in FIG. 18, the hybrid core driving device 100 is stopped, for example, after the core 64 is inserted to a predetermined position of the movable die 62. Then, the movement of the movable die 62 continues.

As shown in FIG. 19, the mold clamping force is further applied by the mold clamping device 70 after the fixed die 60 and the movable die 62 contact each other.

The "pouring operation" is an operation of supplying a liquid metal (molten metal) to an injection sleeve of the injection device 74 using a molten metal supply device (not shown).

Figure 20:
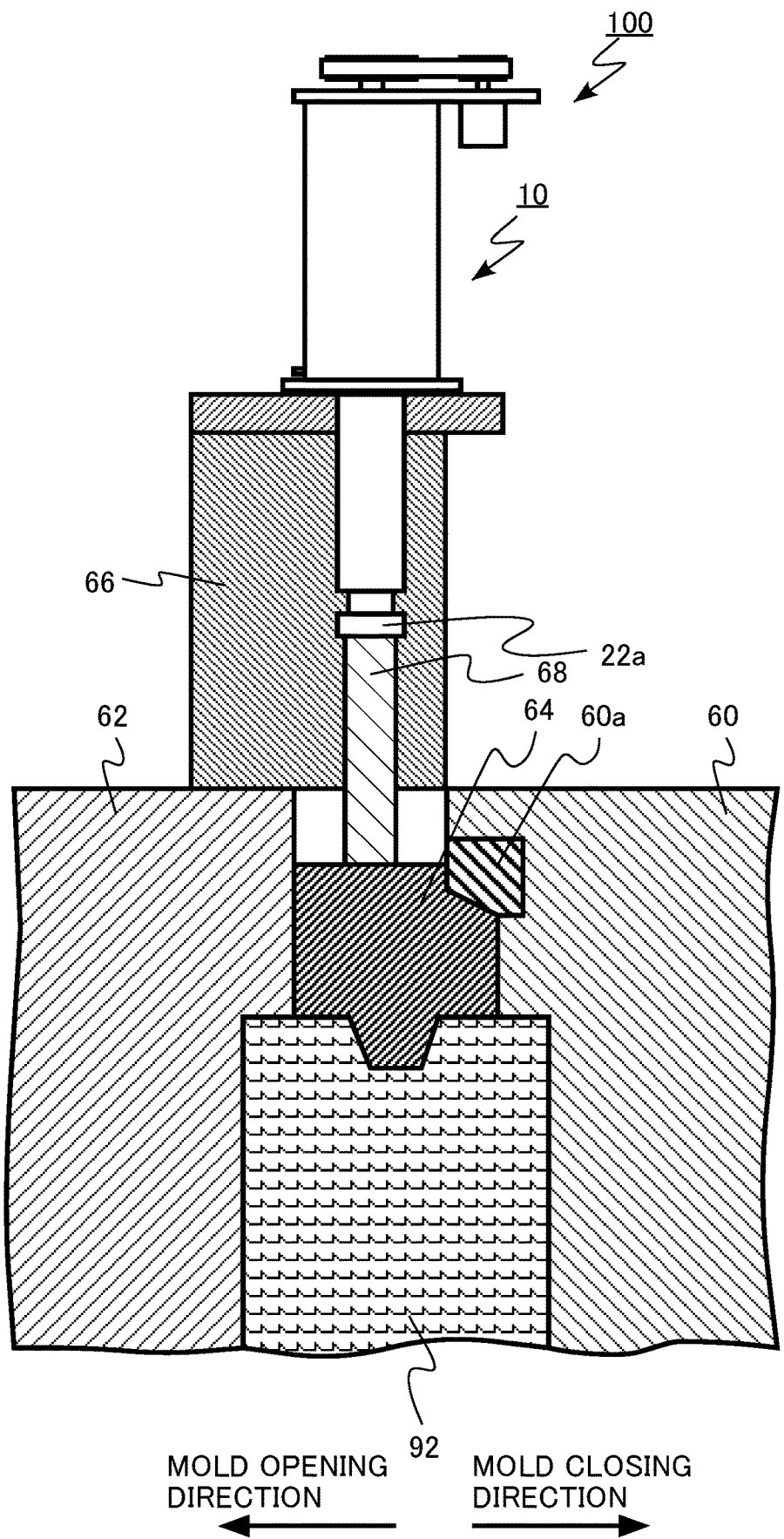
FIG. 20 is an explanatory diagram of the operation of the molding machine of the second embodiment.

The "injecting operation" is an operation of injecting the molten metal into the mold using the injection device 74. As shown in FIG. 20, a molten metal 92 is filled into a cavity surrounded by the fixed die 60, the movable die 62, and the core 64. At this time, the pressure (metal pressure) of the molten metal 92 is applied in a direction in which the core 64 is extruded. The core 64 is suppressed from being extruded by the stopper 60a provided in the fixed die 60.

Figure 21:
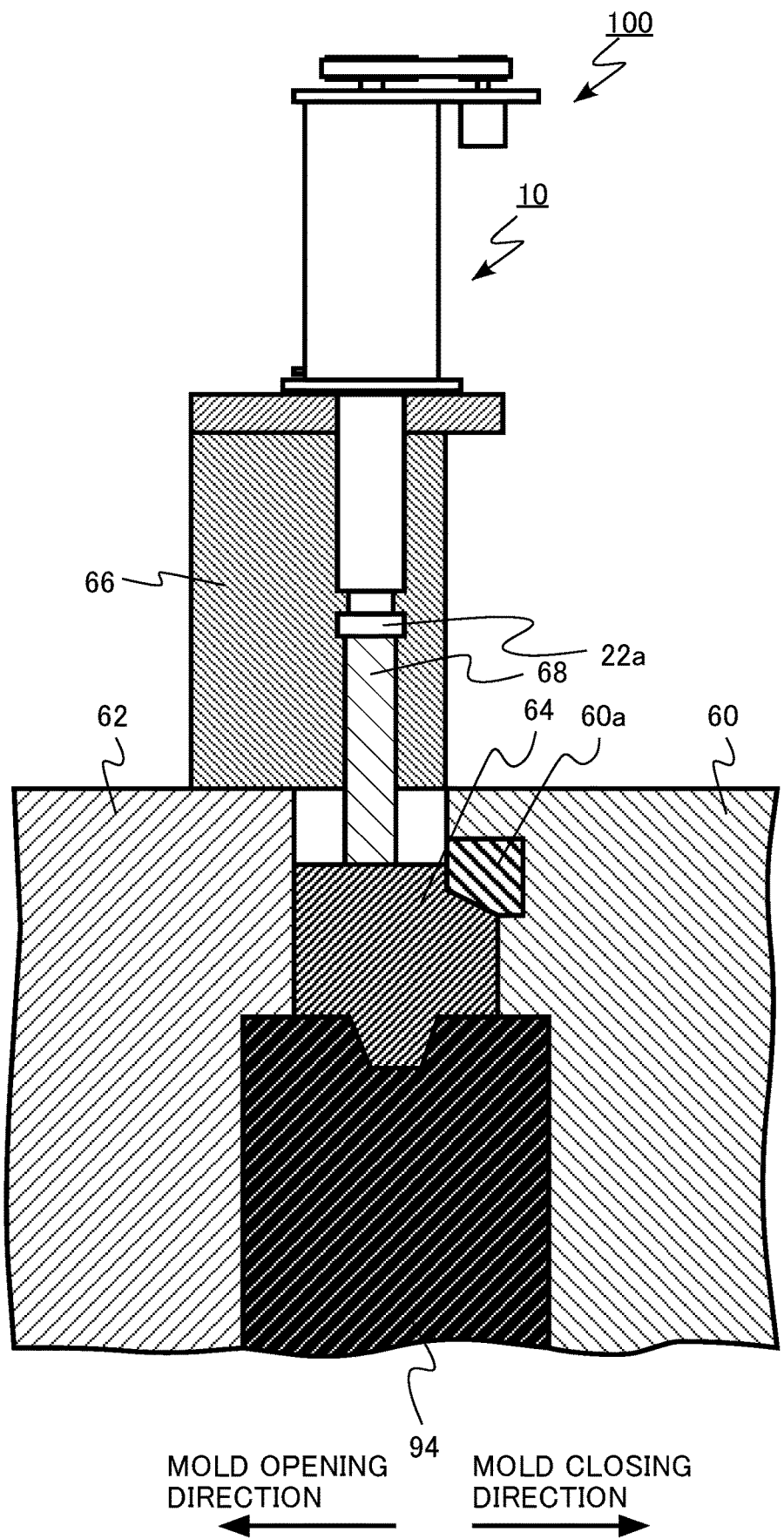
FIG. 21 an explanatory diagram of the operation of the molding machine of the second embodiment.

The "cooling operation" is an operation of manufacturing a die-cast product by cooling the molten metal 92 in the mold. As shown in FIG. 21, the molten metal 92 in the mold is cooled to be a die-cast product 94.

The "mold opening operation" is an operation of opening the fixed die 60 and the movable die 62 in the mold opening direction using the mold clamping device 70. The "core returning operation" is an operation of pulling out the core 64 from the movable die 62 using the hybrid core driving device 100.

Figure 22:
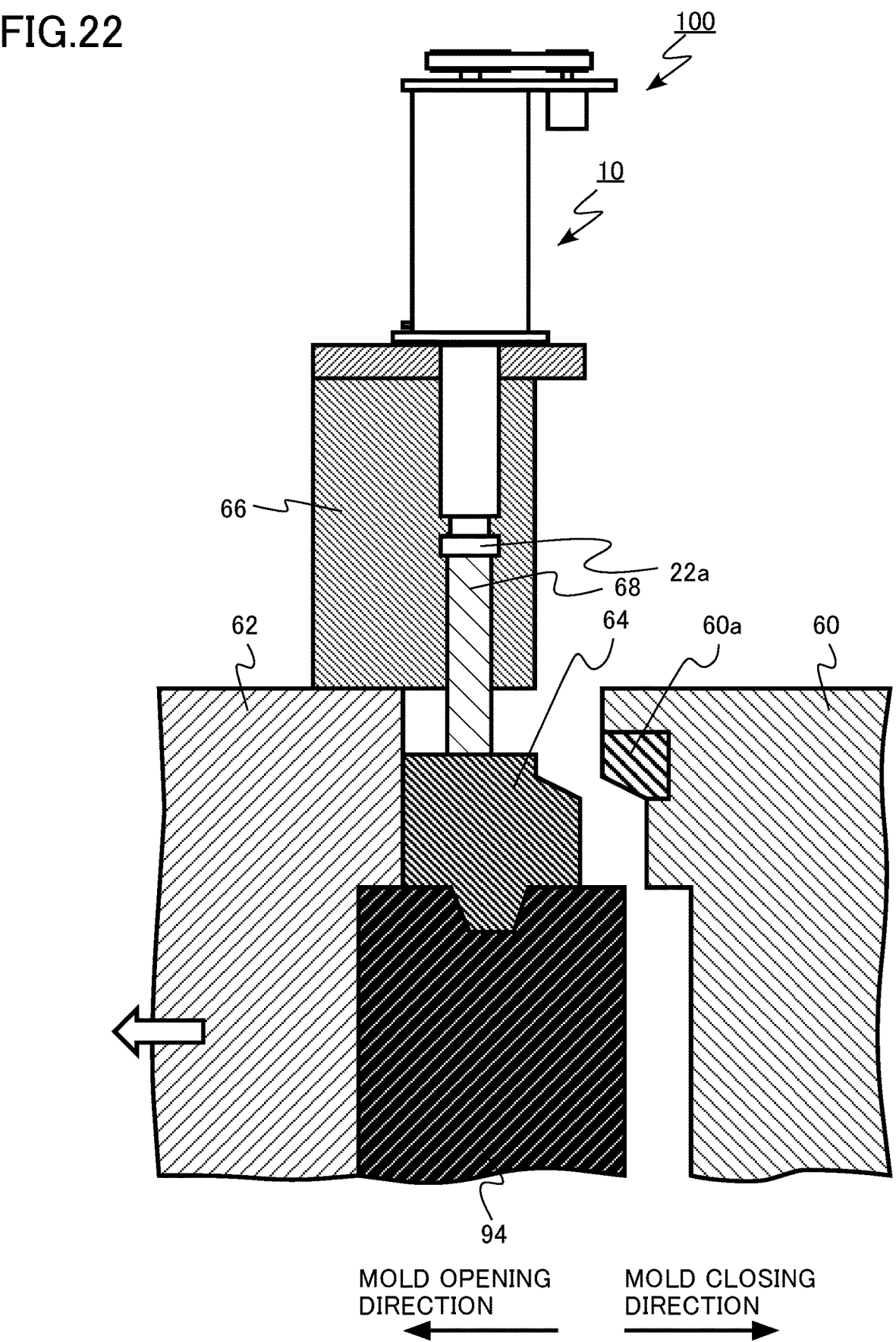
FIG. 22 is an explanatory diagram of the operation of the molding machine of the second embodiment.
Figure 23:
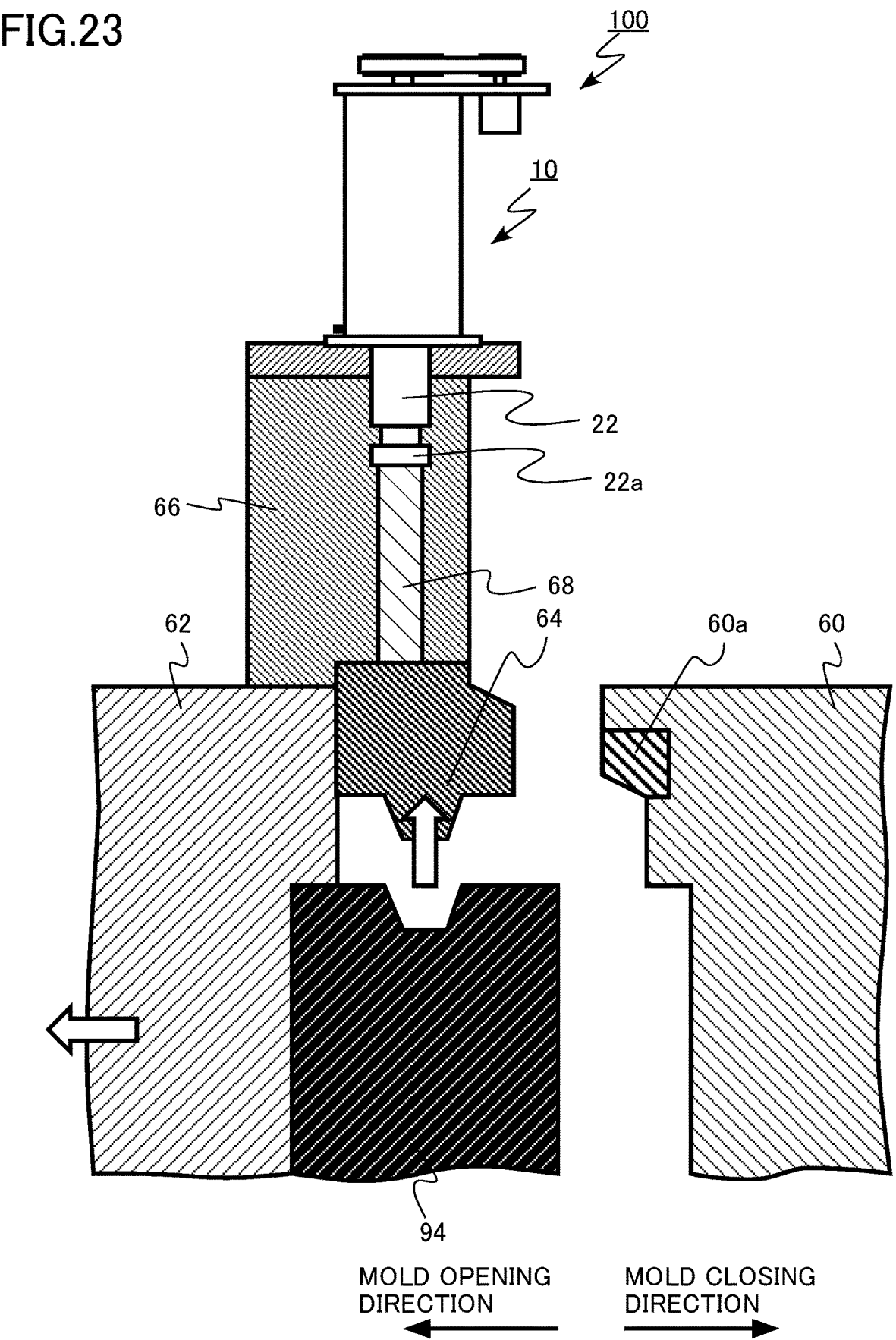
FIG. 23 is an explanatory diagram of the operation of the molding machine of the second embodiment.
Figure 24:
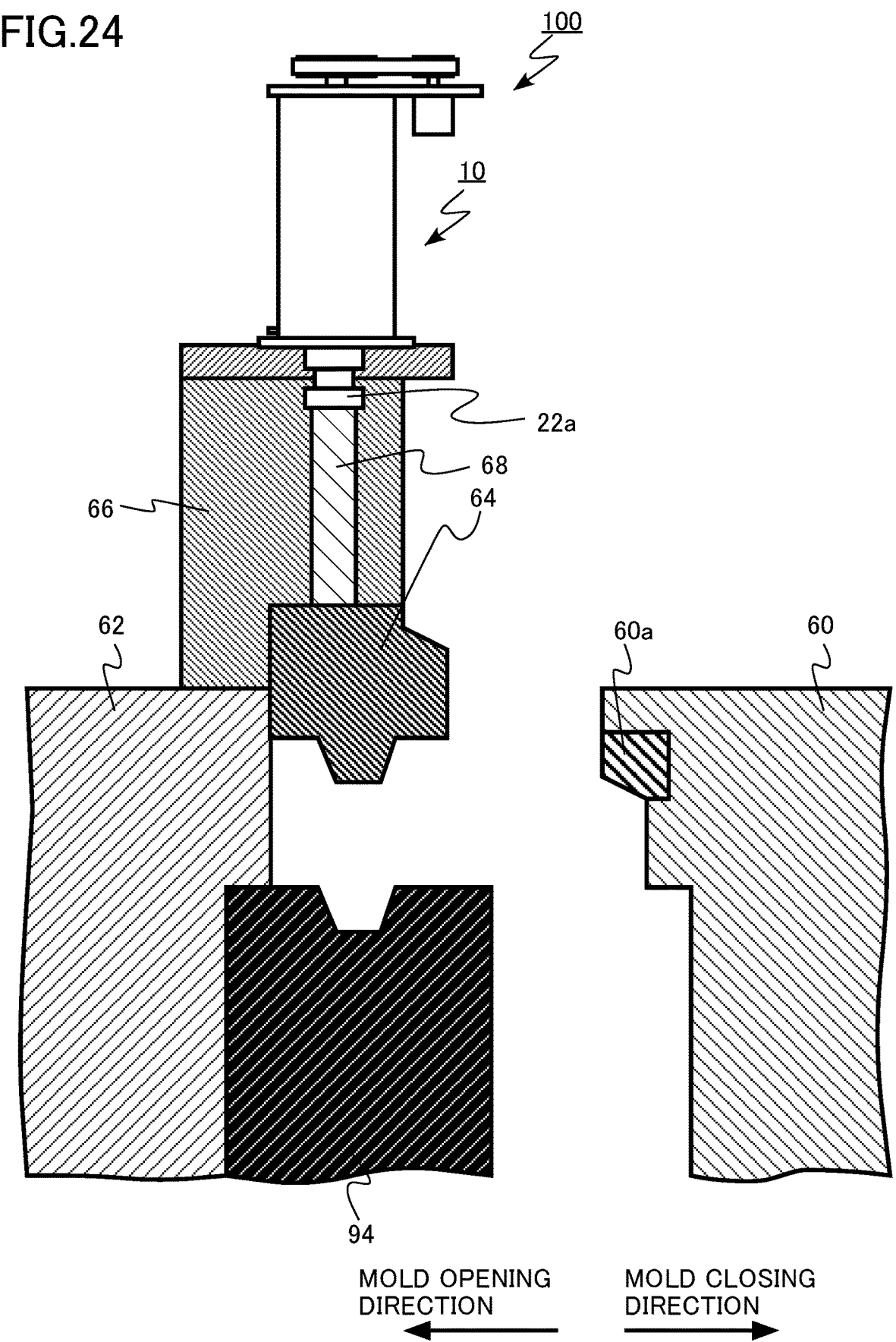
FIG. 24 is an explanatory diagram of the operation of the molding machine of the second embodiment.

At least a part of the operations of the "mold opening operation" and the "core returning operation" are performed at the same time. FIGS. 22, 23, and 24 show the operations until the "mold opening operation" and the "core returning operation" end.

As shown in FIG. 22, the core 64 and the die-cast product 94 are separated from the fixed die 60 by moving the movable die 62 in the mold opening direction using the mold clamping device 70. Then, as shown in FIG. 23, the core 64 is pulled away from the die-cast product 94 at the same time as the movement of the movable die 62 in the mold opening direction.

The core 64 is pulled away from the die-cast product 94 by driving the first hydraulic circuit 12 of the hybrid core driving device 100 so that the rod 22 is retracted. The core 64 is pulled away from the die-cast product 94 so that the core 64 is pulled out from the movable die 62.

When pulling the core 64 away from the die-cast product 94, the motor 28 of the hybrid core driving device 100 is driven. The driving force of the motor 28 is used in combination with the hydraulic pressure so that the core 64 is pulled away from the die-cast product 94 and the core 64 is pulled out from the movable die 62.

The control unit 76 controls the hybrid core driving device 100 so that the supply of the hydraulic oil to the oil chamber 42 and the rotation of the screw shaft 26 by the motor 28 are performed at the same time when pulling out the core 64 from the movable die 62. In addition, when the core 64 is pulled away from the die-cast product 94 and the core 64 is pulled out from the movable die 62, it is also possible to use only the oil pressure with the motor 28 stopped.

After the core 64 is pulled away from the die-cast product 94, the rod 22 is retracted by the driving of the motor 28 of the hybrid core driving device 100.

As shown in FIG. 24, the driving of the motor 28 of the hybrid core driving device 100 is stopped at a time at which the core 64 is retracted to a predetermined position. Further, the mold clamping device 70 is stopped at a time at which the movable die 62 moves to a predetermined position.

Figure 25:
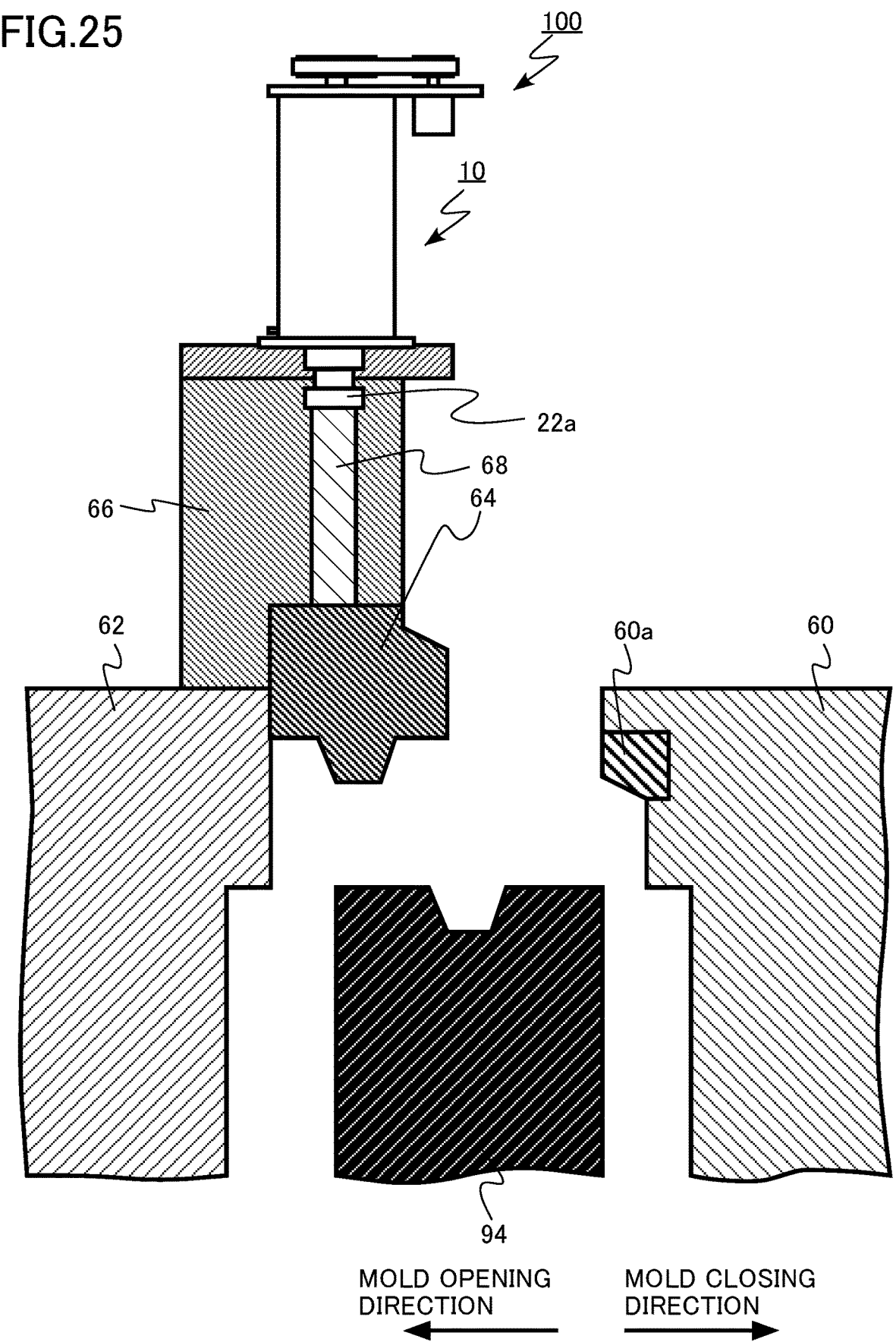
FIG. 25 is an explanatory diagram of the operation of the molding machine of the second embodiment.

The "extruding operation" is an operation of extruding the die-cast product 94 from the mold to be separated from the mold using the extrusion device 72. As shown in FIG. 25, the die-cast product 94 is separated from the movable die 62.

Figure 26:
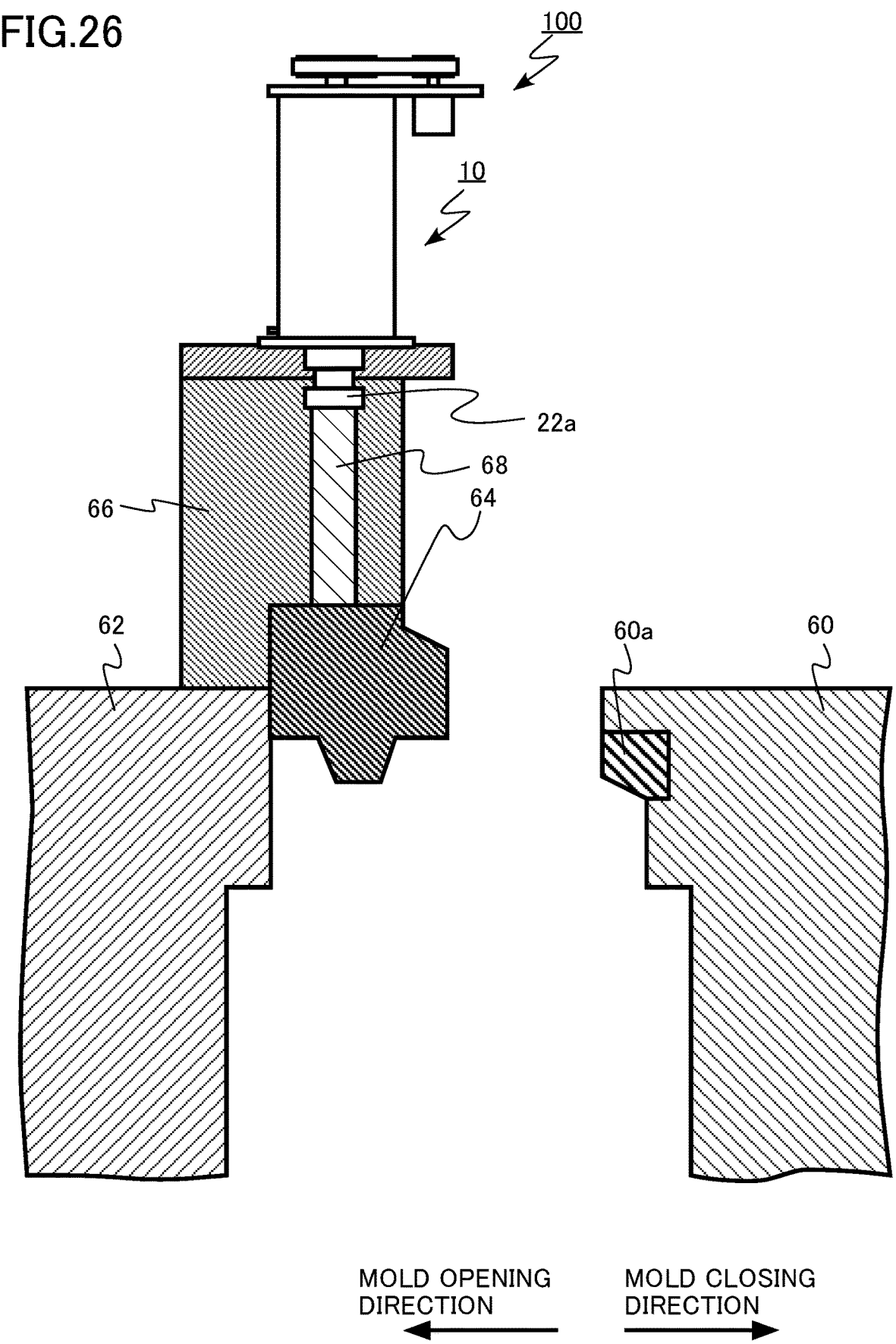
FIG. 26 is an explanatory diagram of the operation of the molding machine of the second embodiment.

The "extracting operation" is an operation of extracting the die-cast product 94 extruded from the mold, for example, by a robot arm. As shown in FIG. 26, the die-cast product 94 is extracted from the mold, for example, by a robot arm (not shown).

Next, the function and effect of the die casting machine 300 of the second embodiment will be described.

Figure 27:
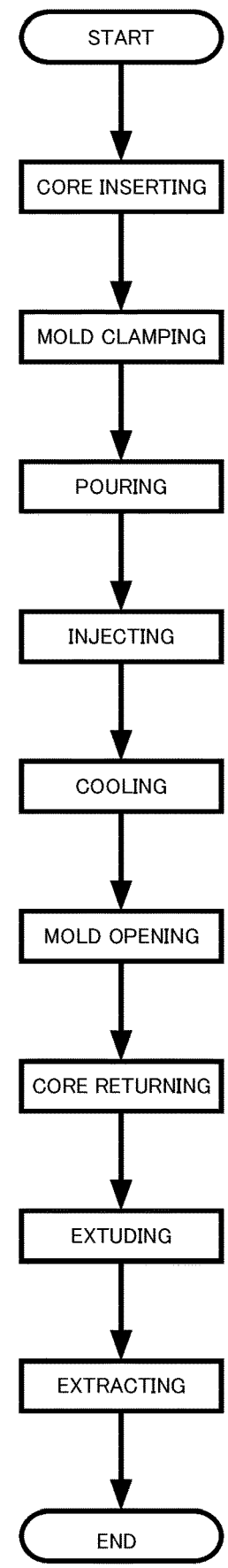
FIG. 27 is a flowchart showing a molding operation of a molding machine of a comparative example of the second embodiment.

FIG. 27 is a flowchart showing a molding operation of a molding machine of a comparative example of the second embodiment. The molding machine of the comparative example is a die casting machine. The die casting machine of the comparative example is different from the die casting machine 300 of the second embodiment in that the core driving device is driven only by the hydraulic pressure and the hydraulic circuit of the core driving device and the hydraulic circuit of the mold clamping device are shared.

In the die casting machine of the comparative example, since the hydraulic circuit of the core driving device and the hydraulic circuit of the mold clamping device are shared, it is not possible to perform the "core inserting operation" and the "mold closing operation" at the same time as shown in FIG. 27. Thus, the "mold closing operation" is performed after the "core inserting operation" ends. Further, in the die casting machine of the comparative example, it is not possible to perform the "mold opening operation" and the "core returning operation" at the same time. Thus, the "core returning operation" is performed after the "mold opening operation" ends.

Since the "core inserting operation" and the "mold closing operation" cannot be performed at the same time and the "mold opening operation" and the "core returning operation" cannot be performed at the same time, it is difficult to shorten the cycle time of the die casting machine.

The die casting machine 300 of the second embodiment includes the hybrid core driving device 100 that performs both a hydraulic drive and an electric power drive. Further, the first hydraulic circuit 12 of the hybrid core driving device 100 and the second hydraulic circuit 78 driving the mold clamping device 70 are independently provided.

Then, the control unit 76 controls the mold clamping device 70 and the hybrid core driving device 100 so that the movable die 62 and the core 64 are operated at the same time. Thus, at least a part of the operations of the "core inserting operation" and the "mold closing operation" can be performed at the same time. Further, at least a part of the operations of the "mold opening operation" and the "core returning operation" can be performed at the same time. Thus, it is possible to shorten the cycle time of manufacturing the die-cast product 94 by the die casting machine 300.

As described above, according to the second embodiment, it is possible to realize the molding machine capable of shortening the cycle time of manufacturing the product by including the hybrid core driving device which performs both the hydraulic drive and the electric power drive.

As described above, the embodiments of the invention have been described with reference to specific examples. However, the invention is not limited to these specific examples. In the embodiments, the description of the parts of the hybrid core driving device, the molding machine, and the like that are not directly required for the description of the invention are omitted, but the required elements related to the core driving device, the molding machine, and the like can be appropriately selected and used.

In the first embodiment, an example of a case in which the screw shaft 26 and the nut 24 constitute the ball screw has been described. However, the configurations of the screw shaft 26 and the nut 24 are not limited to thereto. For the screw shaft 26, for example, a trapezoidal screw having a trapezoidal cross-section can be used. When the trapezoidal screw is used for the screw shaft 26, the frictional resistance between the screw shaft 26 and the nut 24 increases. For example, even when the fixed die 60 does not include the stopper 60a, it is possible to suppress the core 64 from being extruded by the pressure of the molten metal 92.

In the first embodiment, an example of a case in which the motor 28 is the induction motor has been described, but the motor 28 is not limited to the induction motor. A servo motor can be used as the motor 28. For example, when a servo motor is used, it is possible to perform the torque control of the motor 28 when pulling the core 64 away from the die-cast product 94 and to shift to the speed control of the rod 22 after the core is pulled away.

In the first embodiment, the first pulley 34, the second pulley 36, and the belt 38 are used as the transmission mechanism for the rotation of the motor 28 to the screw shaft 26. However, the transmission mechanism is not limited to this configuration. For example, the rotation of the motor 28 may be directly transmitted to the screw shaft 26. Further, for example, a combination of a plurality of gears may be used as the transmission mechanism.

In the first embodiment, an example of a case in which the hydraulic oil of the oil chamber 42 is extruded into the pipe 14 so that the accumulator 52 is filled with the hydraulic oil when the rod 22 advances has been described. However, for example, when a new oil chamber or piston is provided, it is possible to fill the accumulator 52 with the hydraulic oil by retracting the rod 22.

In the second embodiment, an example of a case in which the die casting machine 300 includes the first hydraulic circuit 12 and the second hydraulic circuit 78 provided independently has been described. However, for example, at least a part of the first hydraulic circuit 12 and the second hydraulic circuit 78 can be shared. Also in this case, at least the driving of the hybrid core driving device 100 by the motor 28 can be performed independently from the operation of the mold clamping device 70. Thus, at least a part of the operations of the "core inserting operation" the "mold closing operation" can be performed at the same time.

In the second embodiment, an example of a case in which the molding machine is the die casting machine has been described, but the molding machine may be, for example, an injection molding machine which manufactures a plastic product.

In the second embodiment, an example of a case in which the hybrid core driving device 100 is fixed to the movable die 62 has been described, but the hybrid core driving device 100 can be fixed to the fixed die 60.

Further, in the first and second embodiments, a rotation stop mechanism for the rod 22 with respect to the cylinder tube 16 is not mentioned. This is because the core 64 fixed to the tip of the rod 22 is combined with the movable die 62 to function as a rotation stop mechanism for the rod 22 with respect to the cylinder tube 16. However, for example, it is also possible to provide a rotation stop mechanism for the rod 22 such as a linear guide in the cylinder tube 16.

In addition, all hybrid core driving devices and molding machines having the elements of the invention and appropriately redesigned by those skilled in the art are included in the scope of the invention. The scope of the invention is defined by the scope of claims and the scope of their equivalents.

What is claimed is:

1. A hybrid core driving device comprising:
a cylinder tube;
a first cover member fixed to one end of the cylinder tube;
a second cover member fixed to another end of the cylinder tube;
a rod provided in the cylinder tube, at least a part of the rod provided in the cylinder tube, the rod having a connecting portion provided at one end to be connectable to a core, the rod having an annular flange provided on a side of the second cover member in relation to the connecting portion, the rod penetrating the first cover member, and the rod configured to move straight with respect to the cylinder tube;
a nut fixed to the rod;
a screw shaft penetrating the second cover member and the nut, the screw shaft provided to be insertable into the rod and to be rotatable;
a motor rotating the screw shaft;
an annular piston provided in the cylinder tube, the rod penetrating through the annular piston, and the annular piston being slidable with respect to the cylinder tube and the rod; and
a connection portion provided at the cylinder tube, the connection portion being connectable to a pipe supplying a hydraulic liquid operating the piston, the pipe configured to supply the hydraulic liquid to a region surrounded by the cylinder tube, the first cover member, and the piston.

2. The hybrid core driving device according to claim 1, wherein the cylinder tube includes a first region on a side of the first cover member and a second region on a side of the second cover member,
wherein a first inner diameter of the first region is larger than a second inner diameter of the second region, and
wherein the piston is provided inside the first region and an outer diameter of the piston is larger than the second inner diameter.

3. The hybrid core driving device according to claim 1, wherein a movable distance of the piston is 10 mm or less.

4. The hybrid core driving device according to claim 1, further comprising:
a first liquid pressure circuit connected to the pipe and including an accumulator and a switching valve.

5. The hybrid core driving device according to claim 4, wherein the first liquid pressure circuit is configured to fill the hydraulic liquid into the accumulator when the piston moves toward the first cover member.

6. A molding machine comprising:
a base;
a fixed die plate fixed onto the base and holding a fixed die;
a movable die plate provided on the base to be movable in a mold opening and closing direction and holding a movable die to face the fixed die;
a hybrid core driving device driving a core to be combined with the fixed die and the movable die;
a mold clamping device clamping the fixed die and the movable die;
an injection device filling a molten material into a cavity formed by the fixed die, the movable die, and the core; and
a control circuit controlling an operation of the hybrid core driving device,
wherein the hybrid core driving device includes:
a cylinder tube,
a first cover member fixed to one end of the cylinder tube,
a second cover member fixed to the another end of the cylinder tube,
a rod provided in the cylinder tube, at least a part of the rod provided in the cylinder tube, the rod having a connecting portion provided at one end to be connectable to the core, the rod having an annular flange provided on a side of the second cover member in relation to the connecting portion, the rod penetrating the first cover member, and the rod configured to move straight with respect to the cylinder tube,
a nut fixed to the rod,
a screw shaft penetrating the second cover member and the nut, the screw shaft provided to be insertable into the rod and to be rotatable,
a motor rotating the screw shaft, an annular piston provided in the cylinder tube, the rod penetrating through the annular piston, and the annular piston slidable with respect to the cylinder tube and the rod, and a connection portion provided at the cylinder tube, the connection portion being connectable to a pipe supplying a hydraulic liquid operating the piston, the pipe configured to supply the hydraulic liquid to a region surrounded by the cylinder tube, the first cover member, and the piston.

7. The molding machine according to claim 6, further comprising:

a first liquid pressure circuit connected to the pipe and including an accumulator and a switching valve.

8. The molding machine according to claim 7, further comprising:

a second liquid pressure circuit driving the mold clamping device or the injection device, wherein an amount of the hydraulic liquid used in the second liquid pressure circuit is larger than an amount of the hydraulic liquid used in the first liquid pressure circuit.

9. The molding machine according to claim 6, wherein the control circuit controls the hybrid core driving device so that the supply of the hydraulic liquid to the region and the rotation of the screw shaft by the motor are performed at the same time when pulling out the core from the fixed die or the movable die.

10. The molding machine according to claim 6, wherein the control circuit controls the mold clamping device, and wherein the control circuit controls the mold clamping device and the hybrid core driving device so that the movable die and the core are operated at the same time.

* * * * *